United States Patent
Mattsson et al.

(10) Patent No.: US 12,158,453 B2
(45) Date of Patent: Dec. 3, 2024

(54) CONTROL OF A BUFFER PREPARATION PROCESS

(71) Applicant: Cytiva Sweden AB, Uppsala (SE)

(72) Inventors: Lars Mattsson, Uppsala (SE); Ioana Erlandsson, Uppsala (SE); Therese Westman, Uppsala (SE); Enrique Carredano, Uppsala (SE); Jenny Dunker, Uppsala (SE)

(73) Assignee: Cytiva Sweden AB, Uppsala (SE)

( * ) Notice: Subject to any disclaimer, the term of this patent is extended or adjusted under 35 U.S.C. 154(b) by 555 days.

(21) Appl. No.: 17/430,915

(22) PCT Filed: Feb. 24, 2020

(86) PCT No.: PCT/EP2020/054795
§ 371 (c)(1),
(2) Date: Aug. 13, 2021

(87) PCT Pub. No.: WO2020/173886
PCT Pub. Date: Sep. 3, 2020

(65) Prior Publication Data
US 2022/0128523 A1    Apr. 28, 2022

(30) Foreign Application Priority Data

Feb. 28, 2019 (GB) ..................................... 1902747
Jan. 28, 2020 (GB) ..................................... 2001172

(51) Int. Cl.
*G01N 30/34* (2006.01)
*G01N 30/02* (2006.01)
(Continued)

(52) U.S. Cl.
CPC ............. *G01N 30/34* (2013.01); *G01N 30/32* (2013.01); *G01N 30/64* (2013.01); *G01N 30/74* (2013.01);
(Continued)

(58) Field of Classification Search
None
See application file for complete search history.

(56) References Cited

U.S. PATENT DOCUMENTS

| | | | | |
|---|---|---|---|---|
| 7,955,837 B2 * | 6/2011 | Pawlak | ............... | G01N 21/6428 435/7.1 |
| 10,620,108 B2 * | 4/2020 | Kawamoto | ........ | G01N 15/1404 |

(Continued)

FOREIGN PATENT DOCUMENTS

| CN | 101281179 A | 10/2008 |
|---|---|---|
| CN | 102016567 A | 4/2011 |

(Continued)

OTHER PUBLICATIONS

PCT International Search Report and Written Opinion for PCT/EP2020/054795 mailed May 15, 2020 (12 pages).

(Continued)

*Primary Examiner* — Peter J Macchiarolo
*Assistant Examiner* — Jermaine L Jenkins
(74) *Attorney, Agent, or Firm* — Eversheds-Sutherland (US) LLP

(57) ABSTRACT

The present invention relates to a computer-implemented method for controlling preparation of a liquid mixture comprising an acid and its conjugate base or a base and its conjugate acid. The method comprises obtaining (S11) a composition for the liquid mixture to be prepared and determining (S12) a plurality of settings for controlling a preparation of the liquid mixture in one or more automated processes. The plurality of settings are provided (S13) to one or more control systems of the one or more automated processes. The present invention also relates to a buffer tool configured to perform the computer-implemented method, a buffer management system comprising the buffer tool, and a computer readable storage medium (25), having stored thereon a computer program which, when executed in a (Continued)

buffer tool, causes execution of the computer-implemented method.

22 Claims, 18 Drawing Sheets

(51) Int. Cl.
  *G01N 30/32* (2006.01)
  *G01N 30/64* (2006.01)
  *G01N 30/74* (2006.01)
  *G01N 30/88* (2006.01)
(52) U.S. Cl.
  CPC ....... *G01N 30/88* (2013.01); *G01N 2030/025* (2013.01); *G01N 2030/326* (2013.01); *G01N 2030/328* (2013.01); *G01N 2030/8804* (2013.01)

(56) References Cited

U.S. PATENT DOCUMENTS

| | | | |
|---|---|---|---|
| 11,911,712 B2 * | 2/2024 | Nagy | G05D 21/02 |
| 2004/0171171 A1 | 9/2004 | Appoldt | |
| 2008/0206883 A1 * | 8/2008 | Black | G01N 30/34 436/161 |
| 2010/0273189 A1 * | 10/2010 | Akhavan-Tafti | C09B 15/00 435/7.9 |
| 2011/0039712 A1 | 2/2011 | Bjorkesten | |
| 2012/0217192 A1 | 8/2012 | Blank | |
| 2013/0081703 A1 | 4/2013 | Andrei | |
| 2016/0231207 A1 | 8/2016 | Carredano | |
| 2017/0232363 A1 | 8/2017 | Carredano | |
| 2017/0269041 A1 | 9/2017 | Wheat | |

FOREIGN PATENT DOCUMENTS

| | | |
|---|---|---|
| CN | 102947768 A | 2/2013 |
| CN | 103516777 A | 1/2014 |
| CN | 107983261 A | 5/2018 |
| CN | 108226264 A | 6/2018 |
| EP | 0883428 B1 | 4/2004 |
| EP | 2585887 B1 | 1/2019 |
| GB | 282170 A | 12/1927 |
| WO | 2009/131524 A1 | 10/2009 |
| WO | 2011/037530 A1 | 3/2011 |
| WO | 2011/149872 A1 | 12/2011 |
| WO | 2012/082061 A1 | 6/2012 |
| WO | 2015/047173 A1 | 4/2015 |
| WO | 2016/066579 A1 | 5/2016 |
| WO | 2018/229271 A1 | 12/2018 |
| WO | 2019/069046 A1 | 4/2019 |

OTHER PUBLICATIONS

Great Britain Search Report for GB Application No. 1902747.3 mailed Aug. 19, 2019 (4 pages).
Chinese Search Report for CN Application No. 202080017429.5, dated Jan. 27, 2024 (8 pages).
Chinese Office Action for CN Application No. 202080017429.5, dated Jan. 30, 2024 (31 pages).
Xu Jing, et al., Application of the CurTiPot Software for Acid-Base Equilibrium Calculations in University Chemistry Teaching, University Chemistry, No. 8, Aug. 28, 2017, pp. 71-77. English Abstract.
Zhang Zhi, et al., Reserve alkalinity of coolant/antifreeze-important quality indicators, Technology Wind, No. 4, Feb. 9, 2018, pp. 192-193.
Li Li, et al., Preparation of Total Nutrient Admixture, West China Medical Journal, No. 2, Jun. 30, 2006, pp. 334-335.

* cited by examiner

S11
Obtaining a composition for a liquid mixture to be prepared

S11a
Prompting for information of a plurality of attributes of the liquid mixture

S11b
Determining the composition by applying software-implemented algorithm

S12
Determining a plurality of settings for controlling a preparation of the liquid mixture in one or more automated processes

S13
Providing the plurality of settings to one or more control systems of the one or more automated processes

| No | Buffer composition | pH | Salt concentration | Lowest flowrate (L/h) |
|---|---|---|---|---|
| 1 | 20mM Phosphate | 7.0 | | 900 |
| 2 | 20mM Phosphate | 6.5 | 100mM | 900 |
| 3 | 30mM Acetate | 4.0 | | 900 |
| 4 | 30mM Acetate | 4.0 | 50mM | 900 |
| 5 | 30mM Citrate | 3.5 | 2000mM | 300 |
| 6 | 30mM Citrate | 3.5 | 500mM | 300 |

1300

| Pump | Size |
|---|---|
| Water | Size 1 (Full range) |
| Acid | Size 3 (Approximately 1/10 of full range) |
| | Size 2 (Approximately 1/3 of full range) |
| Base | Size 3 (Approximately 1/10 of full range) |
| | Size 2 (Approximately 1/3 of full range) |
| Salt | Size 2 (Approximately 1/3 of full range) |
| | Size 1 (Full range |

| Buffer | Flowrate (L/h) | Stock concentration of acid (A) and base (B) | Size of pump A and pump B |
|---|---|---|---|
| 20mM Phosphate, pH 7.0 | 900 | A.1M B. 0,5M | Pump A: Size 3 Pump B: Size 3 |
| 20mM Phosphate, pH 6.5, 100mM NaCl | 900 | A.1M B. 0,5M | Pump A: Size 3 Pump B: Size 3 |
| 30mM Acetate, pH 4.0 | 900 | A.2M B.0,5M | Pump A: Size 3 Pump B: Size 3 |
| 30mM Acetate, pH 4.0, 50mM NaCl | 900 | A.2M B.0,5M | Pump A: Size 3 Pump B: Size 3 |
| 30mM Citrate, pH 3.5, 2M NaCl | 300 | A.0,3M B.0,3M | Pump A: Size 3 Pump B: Size 3 |
| 30mM Citrate, pH 3.5, 0,5M NaCl | 300 | A.0,3M B.0,3M | Pump A: Size 3 Pump B: Size 3 |

| No | Buffer composition | pH | Salt concentration | Flowrate (L/h) |
|---|---|---|---|---|
| 1 | 50mM Phosphate | 7.0 |  | 300 |
| 2 | 50mM Phosphate | 6.5 | 100mM | 300 |
| 3 | 50mM Acetate | 4.0 |  | 300 |
| 4 | 50mM Acetate | 4.0 | 50mM | 300 |
| 5 | 50mM Citrate | 3.5 | 2000mM | 200 |
| 6 | 50mM Citrate | 3.5 | 500mM | 200 |
| 7 | 1M NaOH |  |  | 200 |

| Buffer | Flowrate (L/h) | Stock concentration of acid (A) and base (B) | Size of pump A and pump B |
|---|---|---|---|
| 50mM Phosphate, pH 7.0 | 300 | A. 0,5M<br>B. 0,5M | Pump A: Size 3<br>Pump B: Size 3 |
| 50mM Phosphate, pH 7.0, 100mM NaCl | 300 | A. 0,5M<br>B. 0,5M | Pump A: Size 3<br>Pump B: Size 3 |
| 50mM Acetate, pH 4.0 | 300 | A. 2M<br>B. 0,3M | Pump A: Size 3<br>Pump B: Size 3 |
| 50mM Acetate pH 4.0, 50mM NaCl | 300 | A. 2M<br>B. 0,3M | Pump A: Size 3<br>Pump B: Size 3 |
| 50mM Citrate, pH 3.5, 2M NaCl | 200 | A. 0,3M<br>B. 0,3M | Pump A: Size 3<br>Pump B: Size 3 |
| 50mM Citrate, pH 3.5, 0,5M NaCl | 200 | A. 0,3M<br>B. 0,3M | Pump A: Size 3<br>Pump B: Size 3 |

Fig. 16

CONTROL OF A BUFFER PREPARATION PROCESS

CROSS REFERENCE TO RELATED APPLICATIONS

This application claims the priority benefit of PCT/EP2020/054795, filed on Feb. 24, 2020, which claims the benefit of Great Britain Application Nos. 1902747.3 and 2001172.2, filed 28 Feb. 2019 and 28 Jan. 2020, respectively, the entire contents of which are incorporated by reference herein.

TECHNICAL FIELD

The present disclosure relates to the field of bio-processing, and more specifically to the field of controlled preparation of a liquid mixture, e.g., a buffer.

BACKGROUND

In the field of bio-processing, obtaining liquids of precisely known composition is in many cases important. In many cases, the composition of the liquid should not only be at each moment precisely known and controlled, but also should vary with time in a precise and controlled manner.

A buffer solution is an aqueous solution comprising a mixture of an acid, a base, and possibly salt and Water for Injection, WFI. The mixture comprises a weak acid and its conjugate base, or a weak base and its conjugate acid, which are blended in a controlled process.

A property of the buffer is that there is only minor impact on the pH of the buffer solution when a small amount of strong acid or base is added to it. Thus, buffer solutions may be used as a means of keeping pH at a nearly constant value in a wide variety of chemical applications, e.g., chromatography or other type of filtration operations. Feedback control may also be applied to maintain the desired accuracy of the buffer solution A buffer solution having a desired pH, and optionally, with a desired ionic strength, may be prepared by calculating the necessary amounts of the ingredients of the buffer and mixing them. A mixture of these ingredients may be performed in preparation system used as a buffer kitchen or as a chromatography system. Examples of such systems is the ÄKTA™ Avant and the BioProcess Inline Conditioning, IC, system developed by GE Healthcare. ÄKTA™ Avant is a buffer blending device capable of preparing buffer solutions from stock solutions using a quaternary valve. IC is a buffer blending device with several pumps for the different components. Buffer management systems for inline buffer preparation using concentrated single-component stock solutions of acid, base, salt, and WFI have been taken into operation. The use of concentrates significantly reduces buffer volumes, saving floor space and tank volumes. Many different buffers can be prepared from the same set of concentrates, streamlining buffer preparation. For accuracy in formulation and consistency between preparations, it is possible to select different feedback modes featuring built-in dynamic control functionality. Such inline buffer preparation systems, also known as inline conditioning systems, may be used for buffer preparation but also as chromatography systems.

Chromatography is a technique for separating chemical and biological substances. In liquid chromatography, buffer solutions are an essential component of the process. It is important to employ liquids of precisely known composition and/or other characteristics, such as pH, ionic strength, etc. in the chromatography. There may also exist a need to vary the composition of the liquid with time. Such composition and its variation may be obtained by mixing or blending two or more liquids with each other using a blending system.

A buffer solution having the desired properties may be prepared by calculating the necessary amounts of the ingredients of the buffer, e.g., using commercially available software, and mixing them. Buffer mixing devices are well known, e.g., as disclosed in the following background art patent applications/patents that are incorporated by reference in their entireties: EP 2 269 055 A1, U.S. Pat. No. 9,446,329 B2, US 2011/0039712 A1, WO 2009/131524A1, U.S. Pat. No. 9,327,212 B2, US 2012/0217192 A1, EP 2 480 943 A1, WO 2011/037530A1, EP 2 585 887 A1, US 2013/0081703 A1, and WO 2011/162666 A1. While background art comprises software solutions for calculating the relative concentrations of the different components of a relatively simple mixture of a weak acid (or base) and a weak base (or acid) depending on the pH, e.g., as defined in EP 2 269 055 A1, there is still a need to control buffer preparations of a more complex nature. Conventional software solutions do not support preparation of such complex buffers, e.g., buffers comprising additional components and salts. And while there are buffer mixing devices, e.g., as defined in EP 2 269 055 A1, which can be used to obtain the relative concentration using feedback control of specific runs, using this type of more complex buffers there is still a need for a tool to analyse the information obtained from such results controlling new runs with similar yet different control parameters. Examples of such control parameters are buffer concentration, concentration of salts and additives, and concentration and volumes of stock solutions. Further examples of relevant parameters are pH, flow rate of the prepared buffer, flow rate ranges of pumps used in the system, or in case of a quaternary valve, the ranges of the relative partitioning of the valve, and a choice of critical parameters among correlated parameters like conductivity and concentration.

Thus, there is a need for methods and tools for calculating the necessary amounts and using theses calculated settings for buffer solution generation, e.g., for buffer solutions of a complex nature being combinations of different strong electrolytes like salts and even strong acids or bases that dissociate completely or weak electrolytes like buffer substances that ionize partially, or combinations thereof.

SUMMARY

An object of the present disclosure is to mitigate, alleviate or eliminate one or more of the above-identified deficiencies in the art.

According to a first aspect, this is achieved by a computer implemented method for preparing a liquid mixture comprising an acid and its conjugate base or a base and its conjugate acid.

The computer-implemented method comprises obtaining a composition for the liquid mixture to be prepared and determining a plurality of settings for controlling the preparation of the liquid mixture in one or more automated processes. The plurality of settings is provided to one or more control systems of the one or more automated processes.

In some embodiments, obtaining a composition for the liquid to be prepared comprises prompting for information of a plurality of attributes of the liquid mixture. The composition for the liquid mixture to be prepared is determined in response to receiving information of the plurality of attributes and applying at least one software-implemented algorithm.

According to some embodiments, attributes of the liquid mixture comprise a liquid mixture type, a liquid mixture concentration and at least one of a liquid mixture density and a liquid mixture conductivity. The software-implemented algorithm may be an algorithm for molarity calculation or molar mass calculation.

According to some embodiments, determining a plurality of settings for controlling the preparation of the liquid mixture comprises retrieving information of a selected automated process of the one or more automated processes. A control mode for a control system of the selected automated process may be determined; the automated process being run using the control mode.

According to some embodiments, the control mode comprises one or more of flow feedback, pH feedback and conductivity feedback.

According to some embodiments, the automated process is run as a buffer kitchen or as a chromatography system. When run as a chromatography system, the control mode may comprise programming of a quaternary valve of the chromatography system.

According to some embodiments, determining a plurality of settings for controlling the preparation of the liquid mixture further comprises determining one or more stock concentrations and determining one or more pump settings for respective pumps used in the automated process.

In some embodiments determining a plurality of settings for controlling the preparation of the liquid mixture comprises to retrieve one or more boundary conditions for respective settings from the one or more control systems, and to validate fulfilment of the one or more boundary conditions. The boundary conditions may comprise one or more of an acid stock volume, a base stock volume, and a minimum and/or maximum flow rate for the respective pumps used in the automated process.

According to a second aspect, the object of the present disclosure is achieved by a buffer tool for controlling preparation of a liquid mixture comprising an acid and its conjugate base or a base and its conjugate acid. The buffer tool comprises a user interface, a control system interface, and processing circuitry. The processing circuitry is configured to execute the method according to the first aspect.

According to a third aspect, the object of the present disclosure is achieved by a computer readable storage medium, having stored thereon a computer program which, when executed in a buffer tool, causes execution of the method according to the first aspect.

According to a fourth aspect, the object of the present disclosure is achieved by a buffer management system for controlling preparation of a liquid mixture comprising an acid and its conjugate base or a base and its conjugate acid. The buffer management system comprises one or more automated processes for preparation of a liquid mixture; one or more control systems for controlling the one or more automated processes; and a buffer tool according to the third aspect.

The above-disclosed aspects enable preparation of a liquid mixture, e.g., in terms of buffer species, buffer concentration and/or salt concentration, based on a desired pH and/or ionic strength and buffer capacity. Based on the desired pH of a liquid mixture, and optionally also a desired ionic strength and buffer capacity, the present invention provides settings for preparation of the liquid mixture with the desired pH, ionic strength and buffer capacity.

The above-disclosed aspects provide improvements in the preparation of a liquid mixture, e.g., in buffer preparation, in that the exact composition is first calculated and put to subsequent use in an automated process for liquid mixture id mixture is subsequently prepared in a single step. Thus, the above disclosed aspects provide for automated calculation of molar recipes, stock concentrations and suitable pump settings based on the pumps that are available in the system. The above disclosed aspects for liquid preparation may, e.g., be used in buffer/process development, buffer/biopharmaceutical production and in an auto-dispensing device for intelligent buffer preparation in microplates or in other lab ware.

The present invention is useful to determine relative component proportions of the buffering species where in addition to the buffering species there is one or more non-buffering salts and additives.

The present invention is advantageous to determine relative component proportions for liquid mixtures such as buffers, which comprise two or more buffering species, often recognized as multiple buffer species liquids. Thus, according to some embodiments two or more stock solutions may be prepared, which stock solutions comprises different buffering species. In an alternative embodiment, stock solution comprising a plurality of buffering species may be provided.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

FIG. 1 is a flow chart illustrating example method steps for controlling preparation of a liquid mixture.

FIG. 13 shows a table of exemplary system characteristics of the generation system.

FIG. 14 shows a table of exemplary system and/or component configurations.

FIG. 15 shows a table of exemplary target characteristics of a target buffer solution.

FIG. 16 shows a table of exemplary system and/or component configurations.

DETAILED DESCRIPTION

Figure 2:
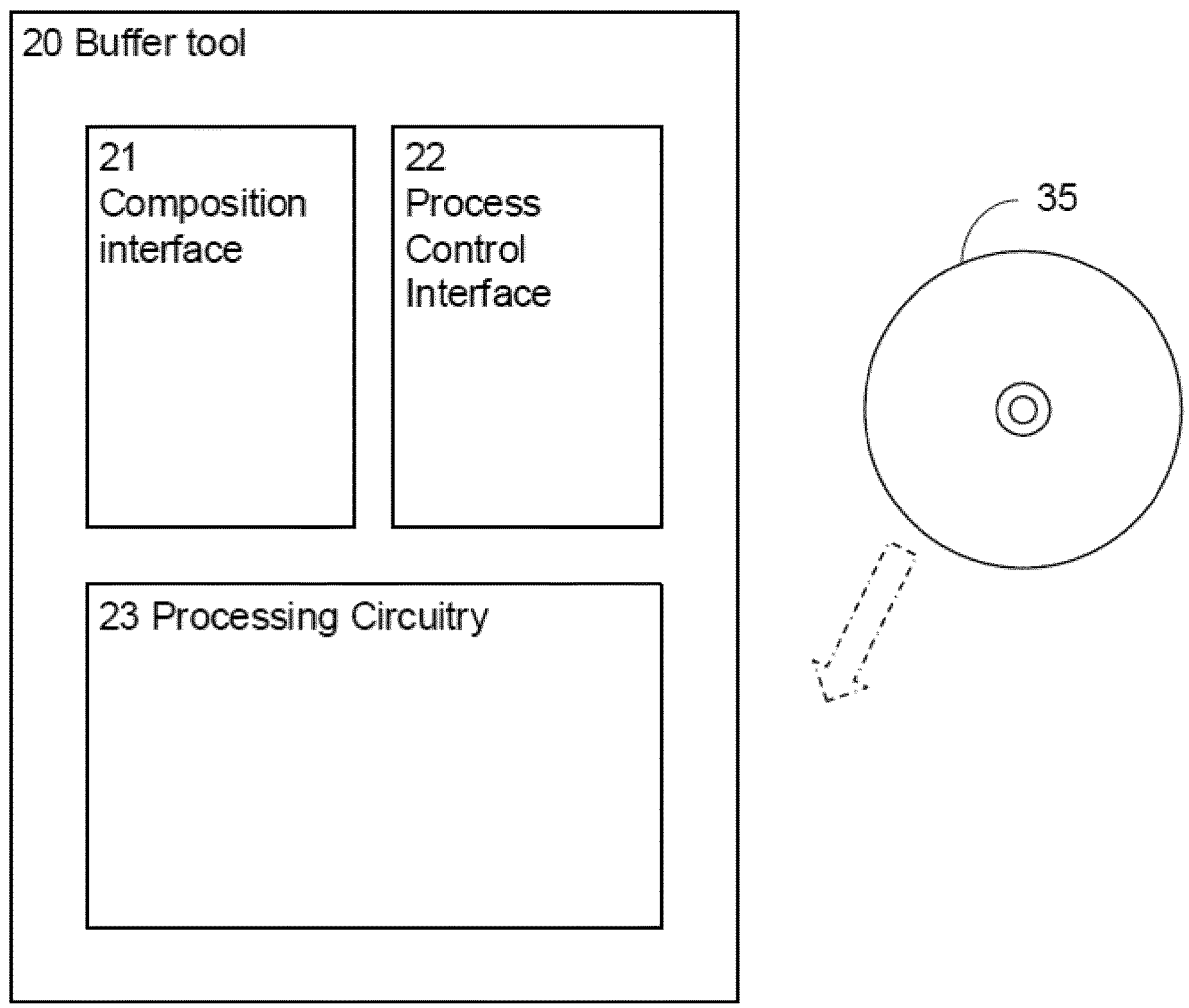
FIG. 2 is a schematic illustration of a buffer tool.

The present application is related to U.S. Pat. No. 9,327,212 incorporated by reference in its entirety herein. The present application is further related to European Pat. application No. EP2585887 incorporated by reference in its entirety herein. The present application is related to PCT application WO2018229271—METHOD AND APPARATUS FOR DETERMINING ONE OR MORE BUFFER COMPOSITION RECIPES, incorporated by reference in its entirety herein.

In the following detailed description, reference is made to the accompanying drawings that form a part hereof, and in which is shown by way of illustration specific embodiments that may be practiced. These embodiments are described in sufficient detail to enable those skilled in the art to practice the embodiments, and it is to be understood that other embodiments may be utilized and that logical, mechanical and other changes may be made without departing from the scope of the embodiments. The following detailed description is, therefore, not to be taken as limiting the scope of the invention.

The terminology used herein is for describing particular aspects of the disclosure only, and is not intended to limit the invention. The term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

In the context of the present disclosure, a buffer is a component or compound that in the form of a liquid mixture maintains a nearly constant pH value despite the addition of substantial quantities of acid and/or base. A buffer solution is an aqueous solution comprising a mixture of a weak acid and its conjugate base or a weak base and its conjugate acid. To prepare such a liquid mixture, i.e., buffer solution, amounts of the weak acid/based and its conjugate base/acid and salt solutions are calculated, e.g., as mole values or so-called mole recipes. From these mole values, the volume needed from corresponding stock solutions or stock concentrations can in turn be calculated. Stock solutions of acid and base may be prepared to known concentration by diluting weighted amounts of buffer salts to measured volumes and controlling a flow from the stock solutions and of water to a common point of mixture of the buffer.

The preparation of the liquid mixture may be performed in a preparation system used as a buffer preparation system/buffer mixing system, here also called buffer kitchen, or as a chromatography system, i.e., a buffer mixing system comprising chromatography column(s).

E.g. a buffer preparation device buffer preparation device with optional tanks/bags for formulated buffers.

Examples of such systems or buffer preparation devices is the ÄKTA™ Avant and the BioProcess Inline Conditioning, IC, system developed by GE Healthcare. ÄKTA™ Avant is a buffer blending device from stock components using a multi-port valve, e.g., quaternary valve that allows for automatic mixing of four different components/fluids. Use of a multi-port valve enables flow control of multiple fluids/components to be mixed. IC is a buffer blending device with several pumps for the different fluids/components.

An "or" in this description and the corresponding claims is to be understood as a mathematical OR which covers "and" and "or", and is not to be understood as an XOR (exclusive OR). The indefinite article "a" in this disclosure and claims is not limited to "one" and can also be understood as "one or more", i.e., plural.

In the present disclosure reference will be made interchangeably to the term "container" or the term "reservoir", denoting a receptacle suitable for holding fluid.

In the present disclosure reference will be made interchangeably to the term "processing circuitry" and the term "processing means".

In the present disclosure reference will be made interchangeably to the term "composition" of the liquid mixture and "recipe", denoting proportions of respective components in a mix that results in a target buffer solution.

In the present disclosure reference will be made interchangeably to the term "preparing" and "generating" in the context of preparing a liquid mixture, typically a buffer solution. In one example, preparing or generating the liquid mixture or buffer solution comprises mixing components according to a recipe, giving the right proportions of respective components and resulting in a target buffer solution. Preparation of the buffer solution typically involves using a single-component, concentrated stock solutions of salt acid, base and water for injection (WFI), by may also include various additives, such as urea, polysorbate, and glycerol.

In the present disclosure reference will be made interchangeably to the term "settings for controlling the preparation of the liquid mixture" and "allocated control parameters", denoting settings and/or parameters used to configure and/or control preparation/generation of the liquid mixture/buffer solution.

In the present disclosure reference will be made interchangeably to the term "control system" and "control unit", denoting an apparatus comprising processing circuitry and a memory, the memory containing instructions executable by the processing circuitry to perform any of the steps or methods described herein, typically controlling the preparation/generation of the buffer solution in the automated processes.

In the present disclosure reference will be made interchangeably to the term "attributes of the liquid mixture" and "target characteristics of a target buffer solution", denoting desired properties or characteristics of a liquid mixture/buffer solution to be prepared.

In the present disclosure the term "fluid source" denotes a unit or arrangement capable of providing a fluid, e.g. a fluid container. In the following description the fluid source will be described as a container, but any suitable fluid source may be used.

In the present disclosure, the term "on-demand buffer solution generation system" denotes a generation system to generate a target buffer solution on demand of a user, typically arranged in close geographical proximity or at the location of a chromatography apparatus. In this disclosure the term "on-demand buffer solution generation system" is used interchangeable with "generation system".

In the present disclosure, the term "operational space" denotes a space formed by bounds within which a buffer generation system can be operated, given a number of operational parameters, such as pump flow rates, pipe dimensions and component concentrations. In other words the operational space can be seen as an abstraction of a multi-dimensional space within which parameters controlling the generation of a buffer solution can be varied and that will result in the generation of a target buffer solution by the on-demand system for generating the buffer solution. E.g. a plurality of possible configurations of system characteristics and component characteristics of an on-demand buffer solution generation system that will achieve given target characteristics of a target buffer solution to be generated by the generation system. In other words, any configuration selected from the multitude of possible configurations can be used to generate a target buffer solution type.

In the present disclosure, the term "buffer solution" denotes a fluid adapted for use with a chromatography apparatus, e.g. used to suspend a sample in before performing a chromatography run.

In the present disclosure, the term "target characteristics" defines properties of a target buffer solution to be generated by the on-demand buffer solution generation system.

In the present disclosure, the term "system characteristics" defines properties of the on-demand buffer solution generation system, e.g. pump flow rate ranges, pipe dimensions and container volumes.

In the present disclosure, the term "component characteristics" defines properties of the components used to generate the buffer solution, e.g. component concentration and component type, such as acid, base or salt.

In the present disclosure, the term "outer operational bounds", defines ranges of properties of the target buffer solution and/or the on-demand buffer solution generation system and/or properties of the components used to generate the buffer solution. E.g. a minimum and maximum pH for the generated buffer solution given a system configuration including component concentrations. In one example, such outer operational bounds are given by boundary conditions. Examples of such boundary conditions comprise one or more of a maximum/minimum acid stock volume, maximum/minimum base stock volume, maximum/minimum flow rate, and maximum/minimum flow rate for the respective pumps used in the automated process.

The present invention is useful to determine relative component proportions for liquid mixtures such as buffers which comprise two or more buffering species, often recognized as multiple buffer species liquids. Thus, in one embodiment, the present invention is a method as discussed above, wherein, two or more stock solutions are prepared which stock solutions comprises different buffering species. In an alternative embodiment, a stock solution comprising at least two, such as three, four or more, buffering species is provided.

The present invention is useful to determine relative component proportions of the buffering species, where in addition to the buffering species there is one or more non-buffering salts and additives.

The buffer tool will control the IC system to run either as a buffer kitchen or as a chromatography system. The tool can control generation of one buffer or methods to run a whole production process including chromatography steps. The systems controlled by the buffer tool can be used as buffer kitchens or as chromatography systems. When used as chromatography systems, the buffer control provides for the generation of a method to run the actual chromatography. The control provided for an optimized process and process development as well as for validated production of biopharmaceuticals.

FIG. 1 is a flowchart illustrating example method steps for controlling preparation of a liquid mixture comprising an acid and its conjugate base or a base and its conjugate acid, e.g., performed in a buffer tool, e.g., as disclosed in FIG. 2. As disclosed in FIG. 3, the buffer tool may be comprised in a buffer management system.

In an optional, initial step, the computer-implemented method for controlling preparation of a liquid mixture comprises retrieving information relevant for controlling preparation of the liquid mixture in one or more automated processes. The computer-implemented method may be implemented in a computer implemented buffer tool having a user interface as disclosed in FIG. 4, where preferably traffic light colours are used to indicate fulfilment, partial fulfilment and non-fulfilment of the set conditions. The information relevant for controlling preparation of the liquid mixture in the one or more automated processes may comprises process information relevant for the one or more automated processes, e.g., as proposed in section 2 of the buffer tool interface illustrated in FIG. 4.

Figure 4:
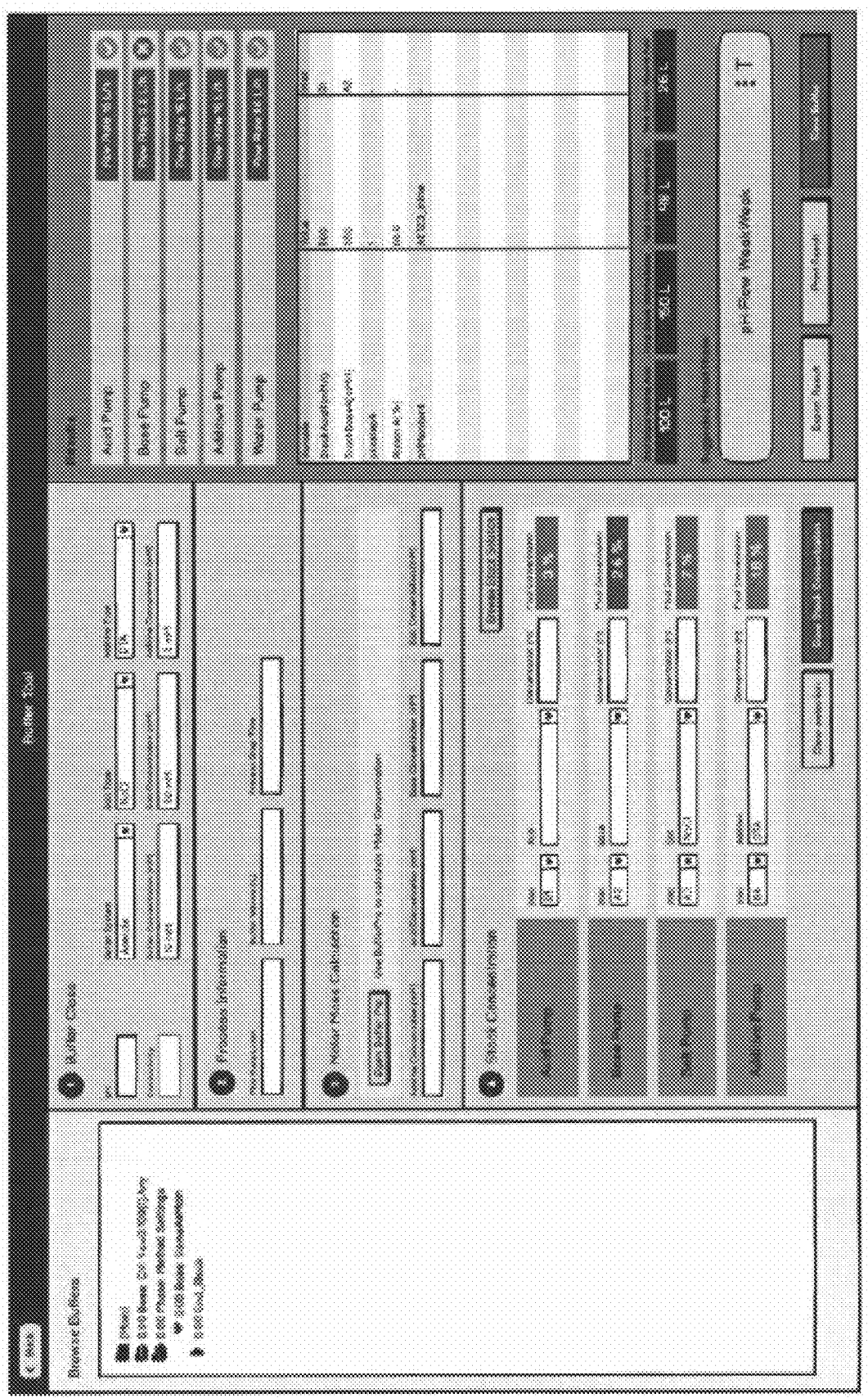
FIG. 4 is an example illustration of a user interface to the computer implemented buffer tool.

The information may also comprise providing access to at least one computer-implemented algorithm applicable for determining a composition of the liquid mixture, e.g., as proposed in section 3 of the buffer tool interface disclosed in FIG. 4. Information may at least in part be received by prompting a user for information, e.g., through sections 2 and 3 of the user interface disclosed in FIG. 4. In one implementation of the computer-implemented method, 4 questions need to be answered in the tool: "Use pH feedback?", "Combination type of buffers?", "Salt?", and "What is important for the process—concentration or conductivity?", i.e., information that is requested by prompting a user for information by means of the buffer tool interface. Information may also partly be received by retrieving the information from the control system, from a database associated with the control system or from a database associated with the buffer tool and comprising library information to define a large plurality of buffer solutions. Examples of other information that may be retrieved comprises buffer system, pH, salt type, additive type, flow rate, buffer volume, process step time, molar recipe, etc.; information that may be retrieved automatically, by prompting a user for information or as a combined operation of initiating automatic retrieving in response to receiving the prompted information.

In its most general form, the computer implemented method for controlling preparation of a liquid mixture comprising an acid and its conjugate base or a base and its conjugate acid comprises a step of retrieving S11 a predetermined composition for the liquid mixture to be prepared, i.e., information or target characteristics of a target buffer solution defining a target buffer and/or characteristics of such a target buffer. In response to receiving an identifier of the liquid mixture, e.g., a buffer name, in depth information relating to the characteristics of the buffer may be retrieved from the database comprising library information to define a large plurality of buffer solutions or calculated from parameters retrieved during execution of the computer implemented method, e.g., as suggested above. Thus, information relating to the relative proportions of stock concentrations to be included in the liquid mixture may be retrieved from a database associated with the buffer tool or accessible from the buffer tool, e.g., by means of wired or wireless communication. Information of relative proportions may also be directly input to the buffer tool in a user interface of the buffer tool. While the liquid mixture, in its most general composition, could consist merely of a composition comprising weak acid and a conjugate base, or vice versa, the composition will in most cases also comprises concentrations of salt, water and/or other additives. Such other additives comprise, for instance, detergents that may contribute to protein stability and urea that may contribute to protein instability. In the context of buffer preparation, additives are mostly made of neutral molecules, whereas salt is made of charged particles used to control conductivity.

According to some embodiments, obtaining S11 the composition for the liquid to be prepared comprises prompting S11a, e.g., by means of a user interface or liquid mixture composition interface, for information of a plurality of attributes of the liquid mixture, e.g., as suggested in section 1 of the buffer tool interface illustrated in FIG. 4. Examples of such attributes comprises a liquid mixture type, a liquid mixture concentration and at least one of liquid mixture density and a liquid mixture conductivity. A liquid mixture pH may be determined as a function of the conductivity and the concentration of the buffer solution. However, the liquid mixture pH may also represent a pre-set attribute of the liquid to be prepared.

In response to receiving information of the plurality of attributes, the composition for the liquid mixture may be determined S11b by applying at least one software-implemented algorithm, e.g., using a molarity calculation or molar mass calculation algorithm as illustrated in section 3 of the buffer tool interface illustrated in FIG. 4.

According to some embodiments, obtaining S11 the composition for the liquid to be prepared comprises running experiments on a chromatography apparatus. The step of obtaining S11 the composition then comprises obtaining design of experiment, DoE, data, wherein the DoE data is indicative of a set of buffer compositions and corresponding unique recipes. The DoE data may e.g. be retrieved from memory. In an embodiment, the set of buffer compositions is selected as a subset from a total set of buffer compositions within a design range. The method may further comprise running a first set of experiments, e.g. using the chromatography apparatus. In an example, the experiment is run by consecutively providing buffer compositions mixed according to each unique recipe indicated by the DoE data as the only input to the chromatography apparatus. The method may further comprise obtaining results of experiment, RoE, data as output from the first set of experiments. In an embodiment, the RoE data is indicative of at least a potential of hydrogen, pH, value of each buffer composition of the set of buffer compositions and/or the total set of buffer compositions. Optionally, the method may further comprise obtaining a first objective function. In an embodiment, the first objective function may at least be dependent on a pH value and a conductivity value. The method may further comprise selecting a second subset from the set of buffer compositions and/or from the total set of buffer compositions which corresponding pH values optimize the first objective function. Optionally, the method further comprises determining the one or more buffer composition recipes for chromatography of a chemical sample as the unique recipes corresponding to the second subset. In an embodiment, the method further comprises, obtaining prediction of experimental, PoE data, wherein the PoE data is indicative of at least a predicted pH value and a predicted conductivity value of each buffer composition of the total set of buffer compositions. Further details on obtaining a composition of the buffer solution can be found in the previously included WO2018229271.

When the buffer tool has received information regarding the target buffer, i.e., when information relating to the desired composition of the liquid mixture has been retrieved in the buffer tool, a next step comprises determining S12 a plurality of settings for controlling the preparation of the liquid mixture in one or more automated processes. Such settings may comprise information of a selected automated process used for the preparation of the liquid mixture, e.g., the automated process being a buffer kitchen process or a chromatography system process. Settings may also comprise a control mode, molar recipes and other settings associated with the attributes such as solution concentration, solution type, volumes; properties that are directly related to the formulated buffer. Other properties like densities, conductivities, and solubility are useful characteristic to the stock solutions, also called base solutions, to ensure that the concentrated solution can be prepared without solubility issues. According to some embodiments, determining a plurality of settings may comprise determining one or more stock concentrations, and determining one or more pump settings for respective pumps used in the automated process. Thus, with the buffer tool all settings needed for controlling buffer preparation in a subsequent selected automated process may be determined. According to some embodiments, the determining comprises determining a control mode of the automated process and wherein the automated process is run using the control mode. Such control modes comprise flow feedback, pH feedback and/or conductivity feedback in selected combinations. Examples are disclosed in the below mentioned previous patent applications/patents that are incorporated by reference in their entireties: U.S. Pat. No. 9,446,329 B2; US 2011/0039712 A1; EP 2 269 055 A1; WO 2009/131524 A1; U.S. Pat. No. 9,327,212 B2; US 2012/0217192 A1; EP 2 480 943 A1; WO 2011/037530 A1; EP 2 585 887 A1; US 2013/0081703 A1; WO 2011/162666 A1. The buffer tool will enable calculation of all settings needed for running an inline conditioning system, either as a buffer kitchen or as a chromatography system. It may provide settings as molar recipes when using flow feedback, settings to control a quaternary valve of a chromatography system, e.g., when running an ÄKTA™ Avant and/or settings with regard to which control mode to use based on the preferences to control either conductivity and/or pH. Thus, the settings needed in the one or more control systems to receive the desired target buffer will be determined.

According to some embodiments, the buffer tool is also capable of providing the functionality of determining whether the target buffer can be produced or not given the stock concentrations and stock volumes available in the subsequent automated processes. The stock concentrations may be directly provided through section 4 of the buffer tool interface illustrated in FIG. 4. However, stock solution availability may also be automatically retrieved from associated applications offering the ability to browse stock solution availability. Consequently, the step of determining a plurality of settings for controlling the preparation of the liquid mixture may further comprise retrieving one or more boundary conditions for respective settings from the one or more control systems and validating fulfilment of the one or more boundary conditions. Examples of such boundary conditions comprise one or more of an acid stock volume, a base stock volume, a minimum flow rate, and a maximum flow rate for the respective pumps used in the automated process. Turning to the illustration in FIG. 4, the base pump flow rate and the base pump final concentration are examples of unfilled boundary conditions that in a colour version may be indicated using a red colour or any other suitable signal colour. If the target buffer cannot be produced, the system may automatically present alternative stock concentrations to choose from based on the system properties/pump ranges. It may calculate volumes needed for each stock solution when determining the settings for producing the target buffer, i.e., controlling the preparation of the liquid mixture. In cases where the same stock solutions may be used to produce several buffers, information may be provided relating to the need of each stock solution of each buffer and a total amount required for each stock solution.

As a concluding step, in order to initiate the actual preparation of the liquid mixture, the method comprises the step of providing S13, e.g., in a process control interface, the plurality of settings to one or more control systems of the one or more automated processes. Thus, settings needed by the control system to run the subsequent automated process, e.g., as a buffer kitchen or as a chromatography system, are provided from the buffer tool. The buffer tool may generate settings for one specific buffer, or for a whole production process including chromatography steps.

According to some embodiments, providing the plurality of settings to one or more control systems of the one or more automated processes comprises providing the plurality of settings to the control system when each boundary is fulfilled. However, as mentioned, the buffer tool is also capable of determining that the target buffer cannot be produced and when determining that the boundary conditions are not fulfilled, providing the plurality of settings to one or more control systems of the one or more automated processes comprises determining a plurality of settings for controlling the preparation of a substitute liquid mixture, and providing the plurality of settings of the substitute liquid mixture to the one or more control systems.

According to some embodiments, the buffer tool may be used to determine settings for a control system running in a feedback mode. The method may then comprises receiving sensor data from the one or more automated processes, determining at least one adjusted setting for controlling the preparation of the liquid mixture in one or more automated processes, and providing the adjusted setting to the one or more control systems of the one or more automated processes. Thus, the automated process of preparing the liquid mixture, the target buffer solution, may be monitored by sensors, e.g., to determine a pH level and conductivity associated with the buffer solution. If the characteristics of the buffer solution are not the desired ones, then the flow rate of the solutions from the containers may be varied so that the buffer solutions with the desired characteristics is obtained.

According to some embodiments, the buffer tool enables selection and optimization of a number of stock concentrations for a process. One or more buffer recipes may be selected for preparing respective liquid mixtures from a database comprising buffer recipes. For instance, several buffer recipes are selected by the user based on criteria (or tags) such as processes run on one system, buffer properties (such as pH, buffer concentration), or type of stock solution. The buffer tools use the retrieved recipes in selecting one or more stock solutions based on the boundary conditions, wherein boundary conditions comprise a volume needed from respective stock solutions for preparing liquid mixtures based on the retrieved buffer recipes. For each selected stock solution, the buffer tool determines a minimum a number of stock concentrations for the retrieved one or more buffer recipes. It could also be that the software suggests potential optimization possibilities based on criteria such as <3-5 different concentrations on one stock solution. Criteria for optimization can be set by the user such as concentration range for the stock solution to be optimized. The buffer tool may give a couple of different options that a user can choose to implement in all/some selected buffer recipes. Options that are not compatible with the system settings, e.g., due to boundary conditions such as pump size and pump size combinations, may also be visible and could be excluded. Following the optimization operation, the one or more buffer recipes are updated with the stock concentrations selected from the determined minimum number of stock concentrations.

FIG. 2 schematically illustrates an example of a buffer tool 20 comprising a liquid mixture composition interface 21, e.g., as illustrated in sections 1-4 of FIG. 4, a liquid mixture process control interface 22, e.g., as illustrated by the Result section in FIG. 4, and processing circuitry 23. The processing circuitry 23 is configured to determine settings for controlling preparation of the liquid mixture in one or more automated processes in response to obtaining a composition for the liquid mixture to be prepared and to provide the plurality of settings to one or more control systems of the one or more automated processes. The buffer tool is applicable for providing settings to a variety of automated processes, e.g., for preparing a liquid mixture in a buffer kitchen application or in a chromatography system.

As further illustrated in FIG. 2, the present disclosure also relates a computer readable storage medium 25, having stored thereon a computer program which, when executed in the buffer tool 20, causes execution of any of the method aspects disclosed above.

Figure 3A:
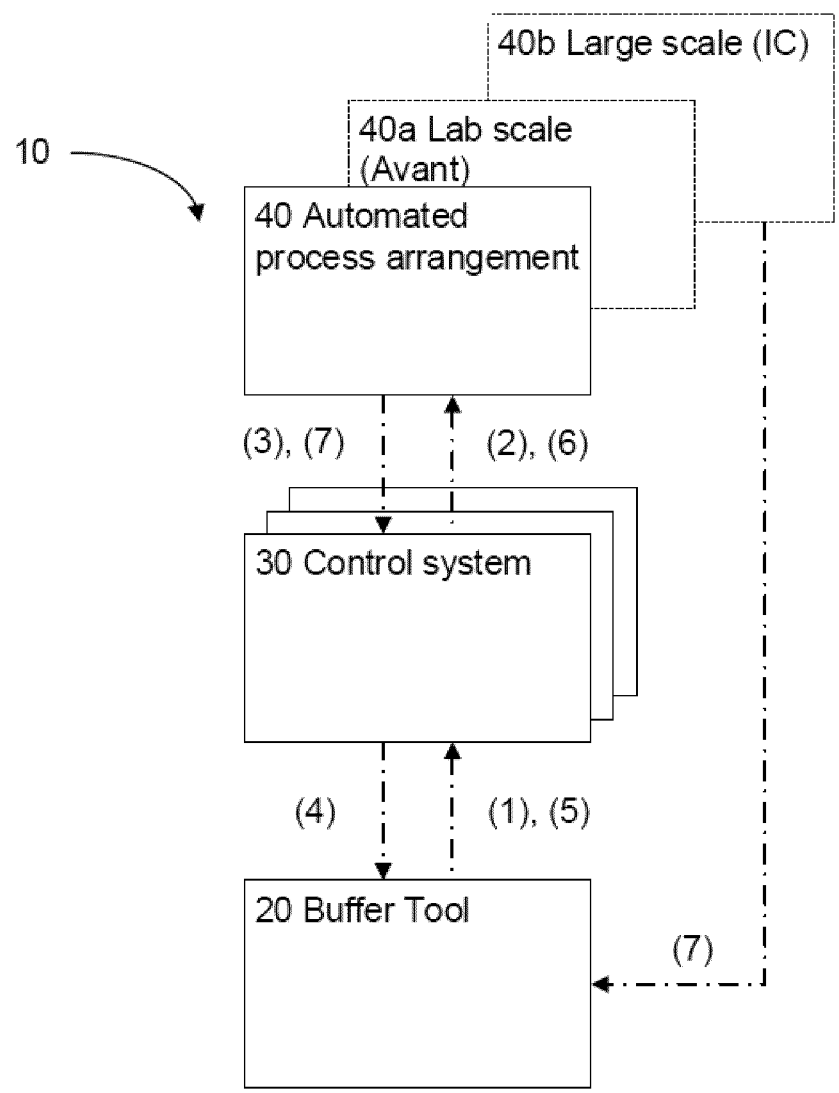
FIG. 3a is an example schematic illustration of a buffer management system.

FIG. 3a illustrates a block diagram of a buffer management system 10 for controlling preparation of a liquid mixture comprising an acid and its conjugate base or a base and its conjugate acid. The buffer management system is configured for inline buffer preparation, using the above disclosed buffer tool and configured to perform the above disclosed method. The buffer management system 10 comprises one or more automated process arrangements 40 for preparation of a liquid mixture, i.e., a buffer solution, and one or more control systems 30 for controlling the one or more automated processes. Preparation of liquid mixture may involve using a single-component, concentrated stock solutions of salt acid, base and water for injection (WFI). The use of concentrates is beneficial for reducing buffer volume and saving tank volumes as well as floor space. In addition, many different buffers can be prepared from the same set of concentrates, streamlining buffer preparation even further. For accuracy in formulation and consistency between preparations, it is possible to use feedback modes featuring built-in dynamic control functionality.

According to some embodiments, the one or more automated process arrangements comprise a chromatography system controlled by a control system 30. A buffer tool 20 is configured to provide a plurality of settings to the control system; the plurality of settings being determined for the purpose of controlling a preparation of the liquid mixture in one or more automated processes.

Figure 3B:
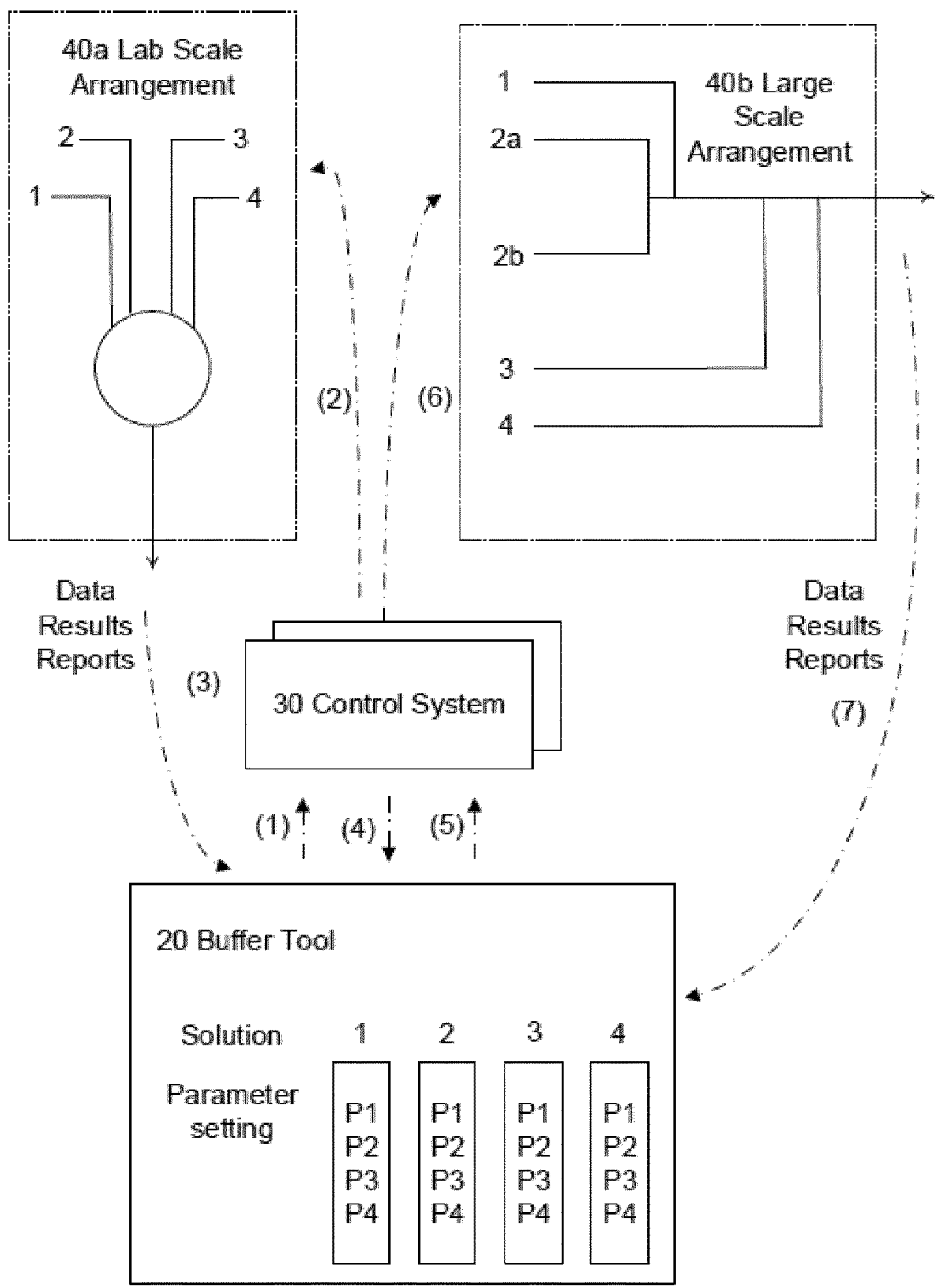
FIG. 3b is an example schematic illustration of a buffer management system.

In an example embodiment illustrated in FIG. 3b, the buffer tool may support a scaling operation for scaling a liquid mixture preparation operation from a lab-scale to a large, industrial scale, e.g., transitioning from a liquid mixture preparation environment in the ÄKTA™ Avant, to a large-scale liquid mixture preparation in the BioProcess Inline Conditioning, IC, system. Avant is a buffer blending arrangement capable of preparing buffer solutions from stock solutions using a quaternary valve, i.e., mainly used for preparing lab-scale amounts of liquid mixture, while IC is a buffer blending arrangement using a plurality of pumps for the different components.

Turning to FIG. 3b, parameter settings for a lab-scale preparation of a liquid mixture, e.g., in the Avant environment, is determined in the buffer tool and provided (1), e.g., in a data message to a control system 30 of the Avant. The parameters are used for determining and providing (2) control settings, e.g., in a control message, from the control system. In the context where the buffer tool is used together with the Avant arrangement, the Avant can do scouting in order to enable determination of the ideal settings, e.g., by allowing a plurality of runs in the Avant while adjusting one or more parameters during each run. Thus, the Avant arrangement can help define parameters for producing buffer solutions in large-scale. In the set up disclosed in FIG. 3b, the buffer tool is used to determine parameter settings that are provided (1) to the control system, e.g., in a data message. The control system proceeds with regulated control of the automated process in the Avant system through providing (2) control parameters, e.g., in a control messages, from the control system to the Avant. The lab-scale arrangement, Avant, operates under control of these control settings to provide a buffer solution. In addition to the buffer solution, the disclosed buffer management system is configured for feedback of data, reports and results to the control software and/or buffer tool. Thus, the lab-scale arrangement, e.g., Avant, may generate data that is provided (3), e.g., in a data message, to the control software or buffer tool. This data is further provided (4) to the buffer tool, e.g., in a data message.

In example embodiments, the buffer tool is configured to convert results and data from the lab-scale arrangement to parameter settings suitable for a larger scale arrangement, e.g., an IC arrangement. The IC arrangement can be used for buffer process development where it generates data that can be used in the buffer tool to make new runs or it can produce buffers for biopharmaceutical production in a validated system. The method that the buffer tool enables, will not only enable control of buffer production in a buffer kitchen but can also be used for a chromatography process.

When the buffer tool is applied for developing parameter settings for a lab-scale process, the tool enables calculation of molar recipes; definitions of which stock concentrations to use; and suitable pump settings. Feedback of these parameter settings may then be used to improve generation of input data for running a large-scale system. Feedback loops from the large-scale arrangement 40b will further advance the improvements by allowing feedback data to be provided (7) from the large-scale arrangement 40b, e.g., IC arrangement, to the control system 30 or buffer tool 20.

Consequently, the disclosed buffer tool is applicable in a plurality of use cases, e.g., supporting liquid mixture preparation for buffer/process development in lab-scale arrangements or in industrial large-scale arrangements, or for industrial buffer/biopharmaceutical production. Furthermore, the buffer tool is configured to allow scale-up and scale-down of the controlled processes. In the above-mentioned use cases, the buffer tool has been applied to buffer kitchen processes or chromatography processes with good results.

In a scale-up scenario, a lab-scale arrangement is initially used for determining a suitable liquid mixture preparation process. The Avant is used to define molar recipes and optimize a liquid mixture procedure; providing (1)-(3) information to from a lab-scale arrangement in the determination of this liquid mixture procedure. The scaled-up procedure is thereafter performed in a large-scale arrangement and is further developed though providing (4)-(7) information between the buffer tool 20, the control system 30, and the large-scale arrangement 40b for the liquid mixture preparation.

In a scale-down or change procedure, e.g., when there is a need to make changes in the production and to validate the new process, settings are retrieved from the large-scale arrangement and provided (7) as information to the buffer tool 20 or control system (30), whereupon lab-scale settings are determined so that a scaled down process may be run and validated in the lab-scale environment prior to running the industrial scale process. Support for this type of scale-up and scale-down is automated through the proposed buffer tool.

The skilled person will also realize that the feedback structure supports simulations of liquid mixture preparation results, e.g., to get output from the buffer tool about buffer qualities, to use the buffer calculator in the buffer tool to get theoretical results that can be compared to the actual results from a liquid mixture preparation run or to determine an expected conductivity using information that may be stored in the buffer tool as a built-in database.

In an industrial, large-scale context, the buffer management system enables a fully automated process for liquid mixture preparation, whereby the liquid mixtures can be produced when needed and validated at point of formulation. Increased dynamics in the controlling of the buffer preparation increases accuracy in pH and/or conductivity.

FIG. 4 discloses an example buffer tool interface comprising a liquid mixture composition interface partitioned in four sections, section 1-4 and a process control interface presented as a Result section.

In section 1 "Buffer Class", the buffer tool may prompt for information of a plurality of attributes of the liquid mixture. Examples of such attributes comprises a liquid mixture type, a liquid mixture concentration and at least one of liquid mixture density and a liquid mixture conductivity. A liquid mixture pH may be determined as a function of the conductivity and the concentration of the buffer solution. However, the liquid mixture pH may also represent a pre-set attribute of the liquid to be prepared. Further attributes relate to type and concentration of salt and additives. In section 2 "Process Information", information relevant for controlling preparation of the liquid mixture in the one or more automated processes may be prompted or presented following retrieval from the control system or another associated system. The process information may comprise process information, e.g., flow rate, buffer volume and process step time. Based on the prompted information, a computer-implemented algorithm may be applied for performing a molarity calculation or molar mass calculation to determine a composition of the liquid mixture. Available stock solutions may be retrieved, e.g., from an automated process or from a control system of the automated process, and used to determine stock concentrations for use during the preparation of the liquid mixture. Section 4 provides an example interface for determining such stock concentrations.

The Result section reflects a number of settings to be applied during control of one or more automated processes for preparation of a liquid mixture comprising an acid and its conjugate base or a base and its conjugate acid. Such results comprise flow rate settings to be applied to various pumps providing acid, base, salt, additive and water when preparing the liquid mixture in an automated process and connecting to inlet B1 and A2.

Thus, the buffer tool will generate a plurality of settings needed by a control system to run an automated process for a target buffer preparation. The buffer tool can generate a method for producing a single buffer solution, but also methods to run a whole production process, e.g., a production process including chromatography steps.

According to some embodiments, a buffer management system 10 in the form of a system for generating the buffer solution is provided.

Figure 5:
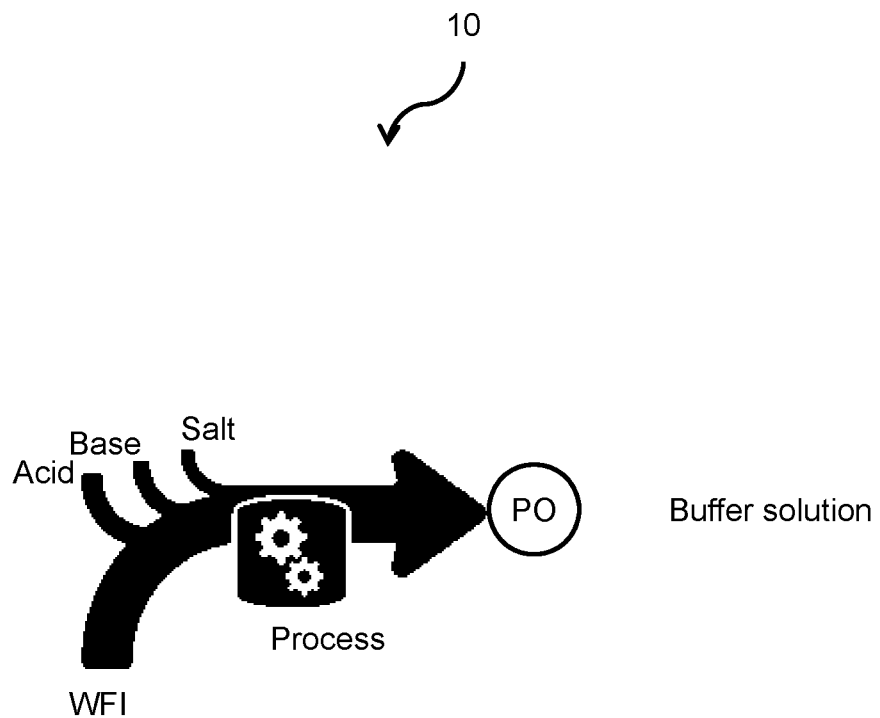
FIG. 5 illustrates a system for preparing or generating a buffer solution.

FIG. 5 illustrates a system 10 for preparing or generating a buffer solution. As can be seen from FIG. 5 a selection of components are mixed to generate the buffer solution. The buffer solution is provided at an output port, PO, at a particular flow rate, e.g. litres per second. The components typically comprise acid, base, salt and water for injection, WFI. Further components may be added, such as urea, polysorbate, and glycerol.

Typically, the WFI is provided by a main pump coupled to a container and a main pipe. The other end of the main pipe is coupled to the output port, PO. The output port, PO, may comprise any combination of a valve, an adapter, a fluid output member or a coupling, e.g. enabling rapid coupling to a hose or other pipe-like structure. The system characteristics, such as dimensions of the main pipe and operational ranges, e.g. flow rate, of the main pump, limits the operational space of the system with regards to the flow rate of the buffer solution, e.g. maximal flow rate.

The type of buffer solution to be prepared or generated will e.g. determine the component characteristics, such as number of components, the required volume of the components and/or the concentration of the components. A total generated volume of the buffer to be generated will e.g. determine the required volume of the components. The required volume of the components is typically determined by a recipe defining the target buffer solution. In other words, the operational space of the system is limited by the selection of components or stock solutions, e.g. the selection of stock solution concentration.

Each of the components will be stored in a container and will be fed to the main pipe for mixing to a buffer solution by a component pump via a component pipe. Each component must be fed to the main pipe at a particular flow rate to generate a particular type of buffer solution. Thus, the system characteristics, such as dimensions of the component pipe and operational ranges, e.g. flow rate range of the component pump, limits the operational space of the system with regards to the flow rate of the buffer solution, e.g. maximal flow rate of the generated buffer solution. This will therefore limit the characteristics of buffer solutions that can be generated, e.g. limit the buffer solution type that can be selected and limit a supported target flowrate of the generated buffer solution As can be understood from the description above, a multitude of possible configurations of the system characteristics and the component characteristics can be used to generate a particular target buffer solution, e.g. at a particular target flow rate, at a particular target pH and at a particular target total volume. This multitude of possible configurations of the system characteristics and component characteristics can be seen as an operational space of the system. In other words, any configuration selected from the multitude of possible configurations can be used to generate a target buffer solution type.

In one example, to generate a particular buffer solution, 10 litres of acid at a particular concentration will be required or alternatively 20 litres of acid at half the concentration will be required. In this example, a volume capacity of a component container holding the acid will have to be doubled and a flow rate capacity of a component pump will have to be doubled, when comparing the 10 litre and 20 litre examples. This may e.g. affect the selection of characteristics for the container and the pump. Thus, a selection must to be made between the system characteristics and the component characteristics, both examples falling within the operational space of the system for a particular target buffer solution.

Figure 6:
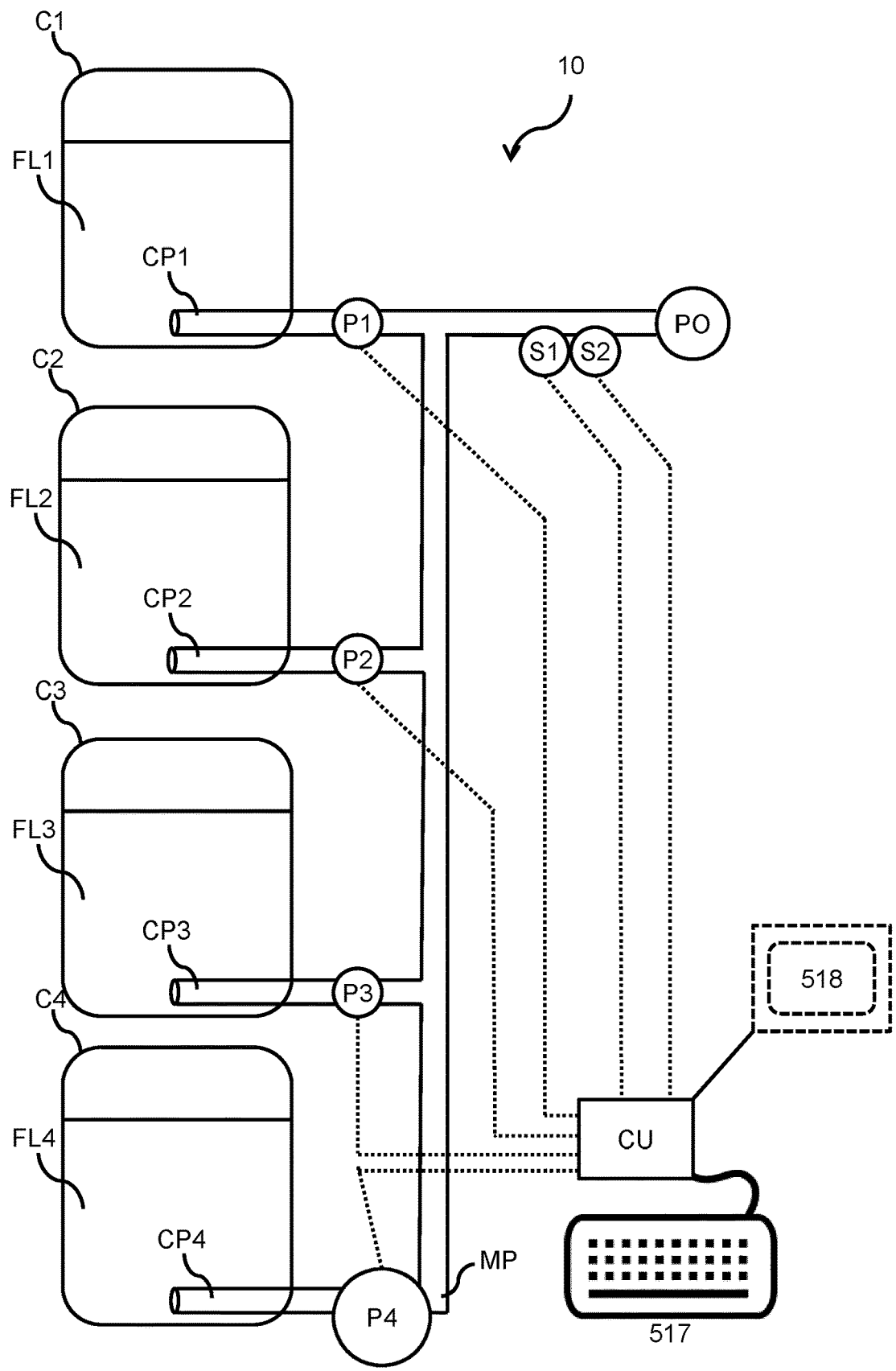
FIG. 6 illustrates a system for generating a buffer solution according to one or more embodiments of the present disclosure.

FIG. 6 illustrates a system 10 for generating a buffer solution according to one or more embodiments of the present disclosure. The on-demand buffer generation system 10 is configured to generate a buffer solution. The generation system comprises a fluid network, e.g. comprising component pipes CP1-CP4 and a main pipe MP. In one embodiment, the fluid network comprises a first pump P1 fluidly coupled to a first container C1, e.g. by a first component pipe CP1. The first container C1 is configured to hold a salt solution FL1. The first pump P1 is configured to convey fluid FL1 from the first container C1 to the output port PO.

Additionally or alternatively, the fluid network further comprises a second pump P2 fluidly coupled to a second container C2, e.g. by a second component pipe CP2. The second container C2 is configured to hold a base solution FL2. The second pump P2 is configured to convey fluid FL2 from the second container C2 to the output port PO.

Additionally or alternatively, the fluid network further comprises a third pump P3 fluidly coupled to a third container C3, e.g. by a third component pipe CP3. The third container C3 being configured to hold an acid solution FL3. The third pump P3 is configured to convey fluid FL3 from the third container C3 to the output port PO.

Additionally or alternatively, the fluid network further comprises a fourth pump P4 fluidly coupled to a fourth container C4, e.g. by a fourth component pipe CP4. The fourth container C4 is configured to hold water for injection FL4. The fourth pump P4 is configured to convey fluid FL4 from the fourth container C4 to the output port PO.

Additionally or alternatively, the fluid network further comprises one or more additional pumps (not shown), each pump fluidly coupled to a corresponding container (not shown) e.g. by a corresponding component pipe (not shown). The container being configured to hold an additive, such as urea, polysorbate, and glycerol. Each of the one or more pumps each is configured to convey fluid from the corresponding container to the output port PO.

Additionally or alternatively, the fluid network further comprises couplings and/or pipes fluidly coupling each of the pumps P1-P4 to the output port PO of the generation system 10. The fluid network may e.g. comprise a main pump P4 that is configured to provide fluid FL4, e.g. WFI, from the container C4 to the output port PO via main pipe/s.

Each of the component pipes CP1-CP4 is typically arranged with an inlet, e.g. at the bottom of the corresponding container C1-C4, at one end and is coupled at the other end to the corresponding pump P1-P4.

The containers may optionally be single use containers or reusable containers. Single use containers have the advantage of not needing cleaning, and reusable containers have the advantage of economy of scale, i.e. will be cheaper in the long run if generation of buffer solution is repeated.

Additionally or alternatively, the on-demand system further comprises a display 518.

Additionally or alternatively, the on-demand system further comprises an input device 517.

Additionally or alternatively, the on-demand system further comprises a control unit CU, 30, 810, 910. The control unit typically comprises the or buffer tool 20 and the control system 30. The or buffer tool 20 comprises circuitry, the circuitry comprising processing circuitry 512, and a memory 515, said memory 515 comprising instructions executable by said processing circuitry 512, wherein the control unit CU, 30, 810, 910 is communicatively coupled to each of the pumps P1-P4, whereby said generation system 10, comprising the control unit CU, 30, 810, 910, is configured to perform any method steps described herein. The control unit CU, 30, 810, 910 is further described in relation to FIG. 9.

Figure 7:
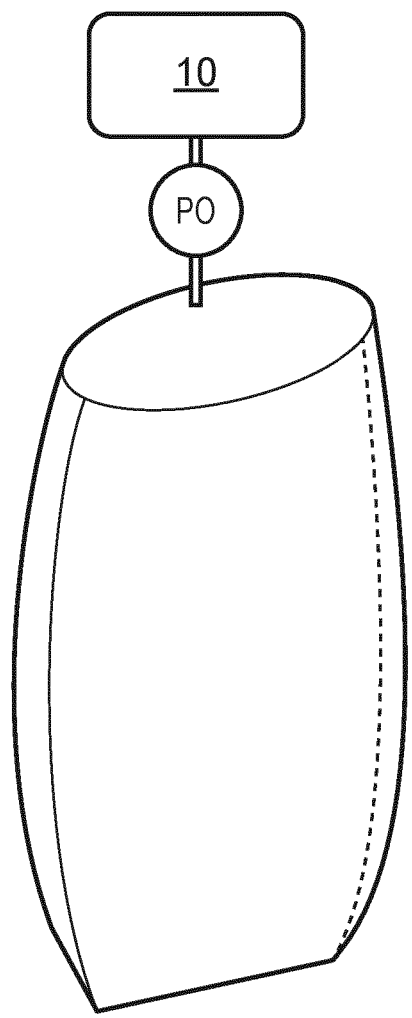
FIG. 7 illustrates on-demand generation of a buffer solution to a container according to one or more embodiments of the present disclosure.

In one embodiment, the system according to any of the preceding claims, further comprises one or more sensors S1, S2 configured to measure characteristics of the generated buffer solution. The control unit CU, 30, 810, 910 is further communicatively coupled to each of the sensors S1, S2. The sensors may be configured to measure pH and/or conductivity of the generated buffer solution. Any suitable sensor for performing measurements on a buffer solution may be used. FIG. 7 illustrates generation of a buffer solution by a system 10 to a container according to one or more embodiments of the present disclosure. In one embodiment of the present disclosure, generation of the buffer solution is typically made just before a chromatography run. In other words, the type of buffer solution needed for a particular chromatography run is generated just in time to start the chromatography run. The generated buffer solution is temporarily stored in a fluid source, e.g. in a single use container or in a reusable container. E.g. the containers shown in FIG. 6.

Figure 8:
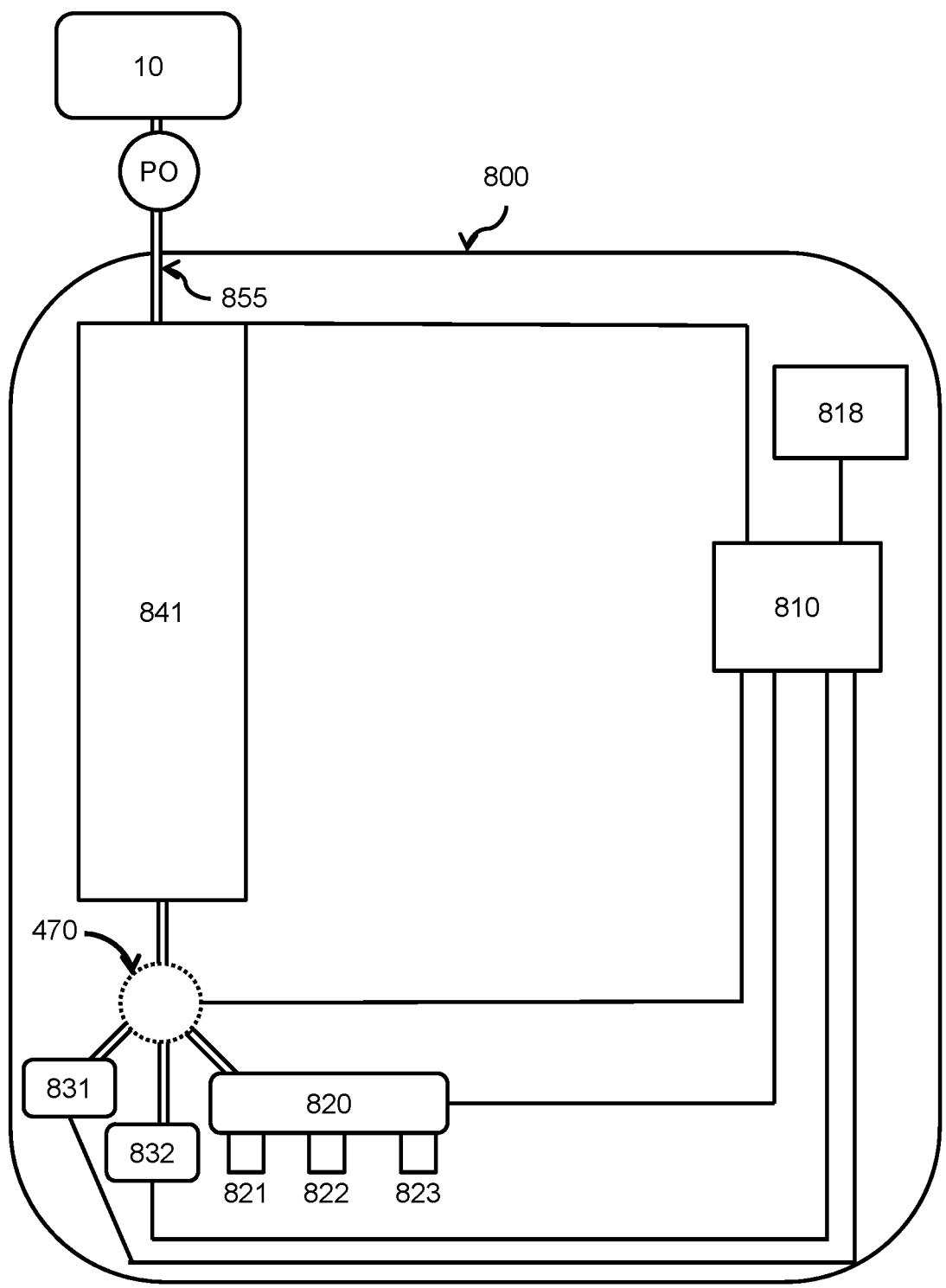
FIG. 8 illustrates on-demand generation of a buffer solution to a container according to one or more embodiments of the present disclosure.

FIG. 8 illustrates generation of a buffer solution to a chromatography apparatus according to one or more embodiments of the present disclosure. In one embodiment, the generation of buffer fluid is performed simultaneously as a chromatography run. I.e. the generation system 10 feeds the generated buffer solution directly into the chromatography apparatus 800 via the output port, PO.

FIG. 8 further shows a chromatography apparatus 800 according to one or more embodiments of the disclosure. The chromatography apparatus 800 may typically comprise at least one inlet 855. The inlet may optionally be coupled too the generation system 10 and/or a reservoir (not shown) configured to hold a fluid, e.g. the eluent. The inlet 855 may e.g. be implemented as tubular elements such as a tube or hose. The inlet 855 may be configured to be coupled to a column 841. The column 841 may be comprised in the chromatography apparatus 800 or arranged external to the chromatography apparatus 800.

The chromatography apparatus 800 may further comprise a control unit 810 which comprises circuitry, e.g. a processor and a memory. The memory may contain instructions executable by the processing circuitry, whereby said control unit 810 and/or chromatography apparatus is operative to perform any of the steps or methods described herein. The control unit 810 may be separate and communicatively coupled to or integrated with the control unit CU, 810 of the generation system 10. The control unit 810 of the generation system 10 is further described in relation to FIG. 9.

The chromatography apparatus 800 may optionally comprise a splitter 870 coupled to a fluid outlet of the column 841 and coupled to a selection of any of a UV sensor 831, a conductivity sensor 832 and an outlet valve 820. The splitter 870 may be configured to direct fluid received from the column 841 to any of the UV sensor 831, the conductivity sensor 832 and the outlet valve 820. Optionally the splitter 870 may be communicatively coupled to the control unit 810 and perform coupling of fluid to any of the UV sensor 831, the conductivity sensor 832 and the outlet valve 820 in response to one or more control signals from the control unit 810.

The UV sensor 831 may be communicatively coupled to the control unit 810 and configured for measuring the quantitative measure, such as UV light absorbance of the fluid, provided by the splitter 870. The chromatography apparatus 800 may further comprise a conductivity sensor 832 communicatively coupled to the control unit 810 and configured for measuring the quantitative measure, e.g. conductivity of the fluid, provided by the splitter 870. The UV sensor 831 and/or the conductivity sensor 832 may further be configured to provide the measured quantitative measure as control signals comprising measurement data to the control unit 810.

The chromatography apparatus 800 may further comprise an outlet valve 820 coupled to the splitter 870. The outlet valve 820 may have one or more outlets or outlet ports 821-823 and is configured to provide the fluid provided by the splitter 870 to the one or more outlets 821-823 in response to a control signal, e.g. received from the control unit 810. In other words, performing fractionation of the eluate.

Figure 9:
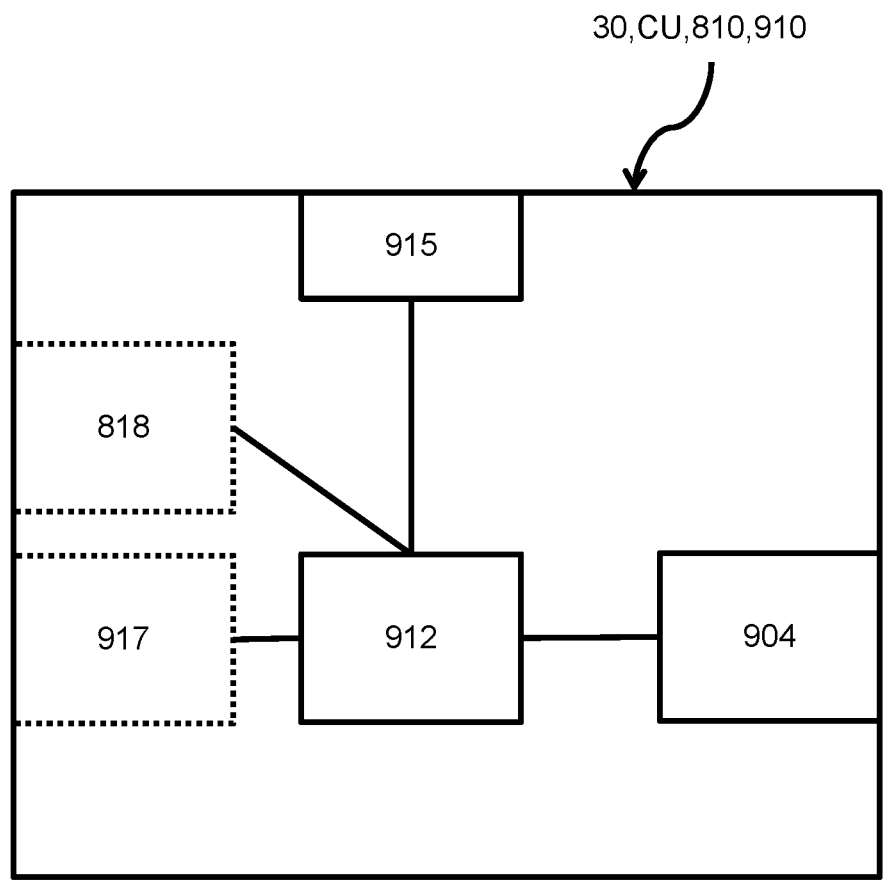
FIG. 9 shows the control unit according to one or more embodiments of the present disclosure.

FIG. 9 shows the control unit CU, 30, 810, 910 according to one or more embodiments of the present disclosure. The control unit CU, 30, 810, 910 may be in the form of e.g. an Electronic Control Unit, a server, an on-board computer, a stationary computing device, a laptop computer, a tablet computer, a handheld computer, a wrist-worn computer, a smart watch, a smartphone or a smart TV. The control unit CU, 30, 810, 910 may comprise processing circuitry 912 communicatively coupled to a transceiver 904 configured for wired or wireless communication. The control unit CU, 30, 810, 910 may further comprise at least one optional antenna (not shown in figure). The antenna may be coupled to the transceiver 904 and is configured to transmit and/or emit and/or receive wired or wireless signals in a communication network, such as Wi-Fi, Bluetooth, 3G, 4G, 5G etc. In one example, the processing circuitry 912 may be any of a selection of processing circuitry and/or a central processing unit and/or processor modules and/or multiple processors configured to cooperate with each-other. Further, the control unit CU, 30, 810, 910 may further comprise a memory 915. The memory 915 may e.g. comprise a selection of a hard RAM, disk drive, a floppy disk drive, a flash drive or other removable or fixed media drive or any other suitable memory known in the art. The memory 915 may contain instructions executable by the processing circuitry to perform any of the steps or methods described herein. The processing circuitry 912 may optionally be communicatively coupled to a selection of any of the transceiver 904, the memory 915, one or more sensors S1, S2, such as the pH sensor and the conductivity sensor S2. The control unit CU, 30, 810, 910 may be configured to send/receive control signals directly to any of the above-mentioned units or to external nodes or to send/receive control signals via the wired and/or wireless communications network.

The wired/wireless transceiver 904 and/or a wired/wireless communications network adapter may be configured to send and/or receive data values or parameters as a signal to or from the processing circuitry 912 to or from other external nodes. E.g. measured pH or conductivity or generated volume of the buffer solution.

In an embodiment, the transceiver 904 communicates directly to external nodes or via the wireless communications network.

In one or more embodiments the control unit CU, 30, 810, 910 may further comprise an input device 917, configured to receive input or indications from a user and send a user input signal indicative of the user input or indications to the processing circuitry 912.

In one or more embodiments the control unit CU, 30, 810, 910 may further comprise a display 818 configured to receive a display signal indicative of rendered objects, such as text or graphical user input objects, from the processing circuitry 912 and to display the received signal as objects, such as text or graphical user input objects.

In one embodiment the display 818 is integrated with the user input device 917 and is configured to receive a display signal indicative of rendered objects, such as text or graphical user input objects, from the processing circuitry 912 and to display the received signal as objects, such as text or graphical user input objects, and/or configured to receive input or indications from a user and send a user-input signal indicative of the user input or indications to the processing circuitry 912.

In a further embodiment, the control unit CU, 30, 810, 910 may further comprise and/or be coupled to one or more additional sensors (not shown in the figure) configured to receive and/or obtain and/or measure physical properties pertaining to the generation system 10 and send one or more sensor signals indicative of the physical properties of the generation system 10 to the processing circuitry 912. E.g. a temperature sensor measuring ambient air temperature.

In one or more embodiments, the processing circuitry 912 is further communicatively coupled to the input device 917 and/or the display 9818, 918 and/or the additional sensors and/or any of the units described in relation to FIG. 6.

Figure 10:
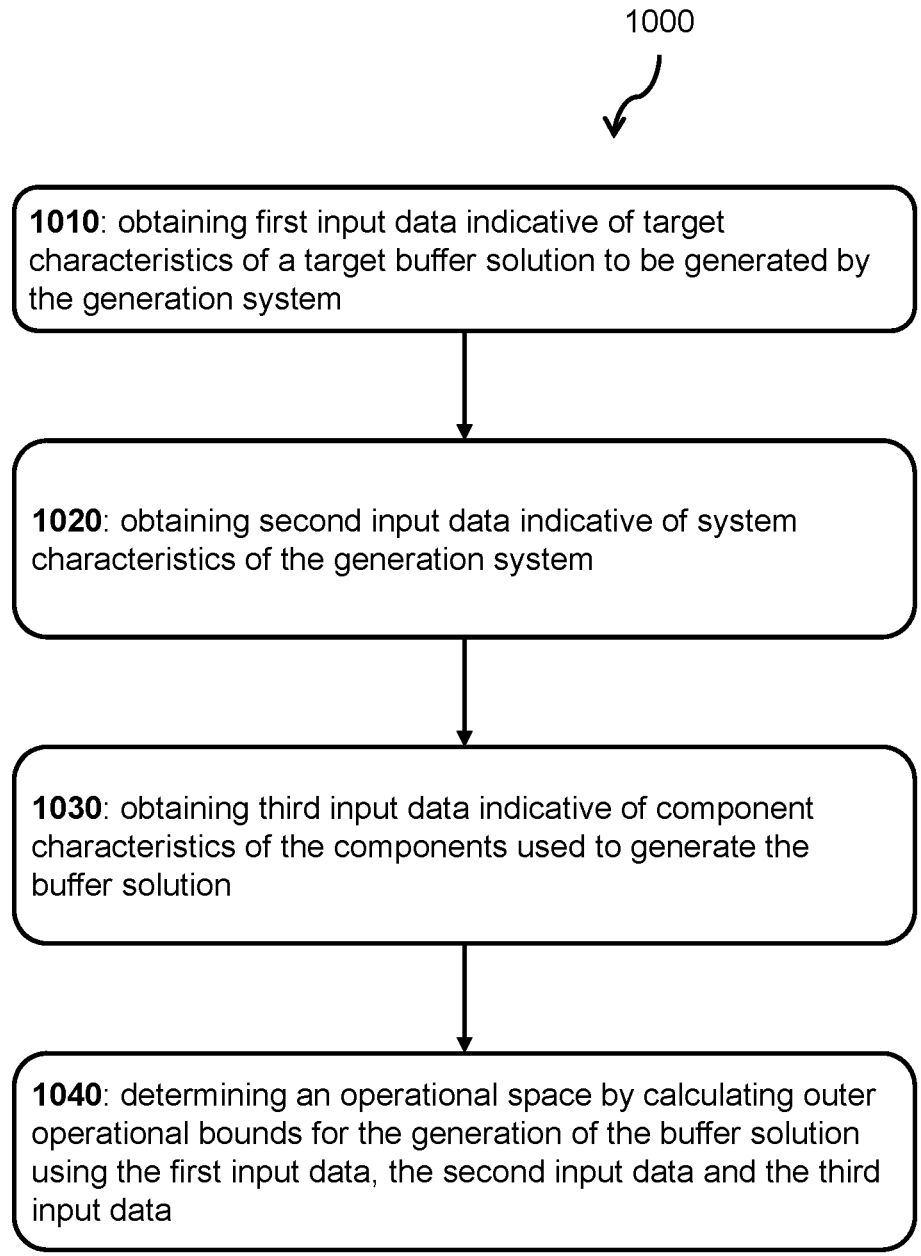
FIG. 10 shows a flowchart of a computer implemented method according to one or more embodiments of the present disclosure.

FIG. 10 shows a flowchart of a computer implemented method 1000 according to one or more embodiments of the present disclosure. The computer implemented method is configured for determining an operational space and is performed by an on-demand buffer solution generation/preparation system 10 configured to generate/prepare a buffer solution. The generation system 10 comprising a plurality of fluid containers C1-C4 for holding components FL1-FL4 of the buffer solution, pumps P1-P4 for conveying fluid from each of the fluid containers C1-C4, pipes fluidly coupling each of the pumps to an output port PO of the generation system 10 and a control unit CU, 810 communicatively coupled to each of the pumps P1-P4. The generation system 10 is further described in relation to FIG. 6. The method comprising:

Step 1010: obtaining first input data indicative of target characteristics of a target buffer solution to be generated by the generation system 10. The first input data may be received from the input device 917 and/or retrieved from memory 915 and/or received in a signal/message from another unit via the communications network, e.g. from a server or cloud server.

The first data may comprise the composition for the liquid mixture to be prepared and be obtained in a similar manner to how the composition for the liquid mixture to be prepared is obtained, as further described in relation to FIG. 2.

In one embodiment, the target buffer solution resulting in the determination of the operational space is defined by target characteristics. In one embodiment, the target characteristics is indicative of a selection of any of a target buffer solution type, target total generated volume of the buffer solution and a target pH of the buffer solution, a target concentration of the buffer solution, target flowrate of the buffer solution, a target salt concentration of the buffer solution.

Optionally or additionally, the target characteristics are indicative of flow rate of the generated buffer solution at the output port PO.

Optionally or additionally, the target characteristics are indicative of concentration of the generated buffer solution.

Step 1020: obtaining second input data indicative of system characteristics of the generation system. The second input data may be received from the input device 917 and/or retrieved from memory 915 and/or received in a signal/message from another unit via the communications network, e.g. a server or cloud server.

In one embodiment, properties of the generating system 10 resulting in the determination of the operational space is defined by system characteristics. In one embodiment, the system characteristics is indicative of a selection of flowrate ranges of pumps, volumes of component containers and pipe dimension of the generation system 10. It is understood that the present disclosure is not limited to the above characteristics, and may also indicate characteristics of other components such as sensors, filters etc.

Step 1030: obtaining third input data indicative of component characteristics of the components used to generate the buffer solution. The third input data may be received from the input device 517 and/or retrieved from memory 515 and/or received in a signal/message from another unit via the communications network, e.g. a server or cloud server.

In one embodiment, properties of the components used to generate the buffer solution and resulting in the determination of the operational space is defined by component characteristics. In one embodiment, the component characteristics is indicative of a selection of any of concentration and solubility of the components of the buffer solution.

In one example, obtaining the first, the second and the third input data comprises prompting for information of a plurality of attributes of the liquid mixture/buffer solution. The composition for the liquid mixture to be prepared is determined in response to receiving information of the plurality of attributes and applying at least one software-implemented algorithm, e.g. an algorithm for molarity calculation or molar mass calculation. The attributes of the liquid mixture/buffer solution may comprise a liquid mixture type/target buffer type, a liquid mixture concentration/target buffer concentration and at least one of a liquid mixture density/target buffer density and a liquid mixture conductivity/target buffer type conductivity.

Step 1040: determining an operational space by calculating outer operational bounds for the generation of the buffer solution using the first input data, the second input data and the third input data. Additionally or alternatively, the second input data are obtained by selecting from a plurality of system characteristics, wherein the third input data are obtained by selecting from a plurality of component characteristics.

Determining the operational space may e.g. comprise determining the plurality of settings for controlling the preparation of the liquid mixture in the one or more automated processes, as further described in FIG. 2.

In one example, the outer operational bounds are calculated by retrieving one or more predetermined boundary conditions for any of the first data and/or the second data and/or the third data, and to select outer operational bounds that can be validated using the one or more boundary conditions. The boundary conditions may comprise one or more of a minimum and/or maximum of an acid stock volume, a minimum and/or maximum of a base stock volume, and a minimum and/or maximum flow rate for the respective pumps used in the automated process. Validation is further described in relation to FIGS. 1, 2 and 3b.

In one example, a user provides input data indicative of a target buffer type of Acetate, a target total volume of the generated buffer solution of 1000 Litres, a target pH of 4.3, a target pH of the generated buffer solution of 4.3 and a target buffer concentration of 100 mM (millimolar). The generation system then determines an operational space indicative of possible containers to use, based on an estimated base component volume of 29.4 Litres, an estimated acid component volume of 35.3 Litres and an estimated salt component volume of 29.4 Litres. I.e. a list of available containers or tanks may be compared to the estimated volumes, and a subset of containers selected from the list of available containers capable of accommodating the required volume is determined.

In one further example, the user further provides input data indicative of component concentration of base FL2 and acid FL3, a main pipe size of one (1) inch, and a flow rate of the generation system of 200 Litres per hour. The generation system then determines an operational space indicative of possible pumps to use, based on estimated flow rates of the different pumps P1-P4, e.g. an estimated flow rate range of 15-600 Litres per hour for the first pump P1, an estimated flow rate range of 4-180 Litres per hour for the second pump P2, an estimated flow rate range of 4-180 Litres per hour for the third pump P3 and an estimated flow rate range of 45-200 Litres per hour for the fourth pump P4. I.e. a list of available pumps may be compared to the estimated flow rates, and a subset of pumps selected from the list of available pumps capable of accommodating the required flow rates is determined.

In some embodiments the proportions of components needed to generate the buffer solution is calculated using a Debye-Hückel equation, this is further described in U.S. Pat. No. 9,446,329 B2 hereby incorporated by reference in its entirety.

In one embodiment, obtaining first input data further comprises receiving user input indicative of target characteristics, where the target characteristics is at least indicative of a target buffer solution type, target concentration of the generated buffer solution and target total generated volume of the buffer solution, calculating further target characteristics using a Debye-Hückel equation or a software-implemented algorithm thereof, where the further target characteristics comprises flow rates of components derived using a recipe defining the target buffer solution type.

Additionally or alternatively, this embodiment may further comprise determining the recipe of the buffer solution by evaluating an equation. Evaluating the equation comprises determining the ion size parameter a in the Debye-Hückel equation based on a weighted mean ion size of all species contributing to the ionic strength of the generated buffer solution, the ionic strength of each species being used as a weighting parameter in the Debye-Hückel equation; determining the relative component proportions of the components of the buffer solution based on the Debye-Hückel equation and the determined ion size parameter a; and calculating further target characteristics indicative of flow rates of components using the proportions of the components and a maximum flow rate derived based on pipe dimensions of the generation system 10.

Additionally or alternatively, this embodiment may further comprise determining the recipe of the buffer solution by obtaining the composition for the liquid to be prepared comprises prompting, e.g., by means of a user interface or liquid mixture composition interface, for information of a plurality of attributes of the liquid mixture/buffer solution, e.g., as suggested in section 1 of the buffer tool interface illustrated in FIG. 4. Examples of such attributes comprises a liquid mixture/buffer solution type, a liquid mixture/buffer solution concentration and at least one of liquid mixture/ buffer solution density and a liquid mixture/buffer solution conductivity. A liquid mixture pH may be determined as a function of the conductivity and the concentration of the buffer solution. However, the liquid mixture pH may also represent a pre-set attribute of the liquid to be prepared. In response to receiving information of the plurality of attributes, the composition for the liquid mixture/buffer solution may be determined by applying at least one software-implemented algorithm, e.g., using a molarity calculation or molar mass calculation algorithm as illustrated in section 3 of the buffer tool interface illustrated in FIG. 4.

Additionally or alternatively, this embodiment may further comprise determining the recipe of the buffer solution by running experiments on a chromatography apparatus. The step of obtaining S11 the composition then comprises obtaining design of experiment, DoE, data, wherein the DoE data is indicative of a set of buffer compositions and corresponding unique recipes. The DoE data may e.g. be retrieved from memory. In an embodiment, the set of buffer compositions is selected as a subset from a total set of buffer compositions within a design range. The method may further comprise running a first set of experiments, e.g. using the chromatography apparatus. In an example, the experiment is run by consecutively providing buffer compositions mixed according to each unique recipe indicated by the DoE data as the only input to the chromatography apparatus. The method may further comprise obtaining results of experiment, RoE, data as output from the first set of experiments. In an embodiment, the RoE data is indicative of at least a potential of hydrogen, pH, value of each buffer composition of the set of buffer compositions and/or the total set of buffer compositions. Optionally, the method may further comprise obtaining a first objective function. In an embodiment, the first objective function may at least be dependent on a pH value and a conductivity value. The method may further comprise selecting a second subset from the set of buffer compositions and/or from the total set of buffer compositions which corresponding pH values optimize the first objective function. Optionally, the method further comprises determining the one or more buffer composition recipes for chromatography of a chemical sample as the unique recipes corresponding to the second subset. In an embodiment, the method further comprises, obtaining prediction of experimental, PoE, data, wherein the PoE data is indicative of at least a predicted pH value and a predicted conductivity value of each buffer composition of the total set of buffer compositions. Further details on obtaining a composition of the buffer solution can be found in the previously included WO2018229271.

Alternatively or additionally, the operational space is further rendered into a representation and displayed, e.g. to a user of the generation system 10. In this embodiment, the method further comprises:

rendering a representation 1100 indicative of the operational space, and controlling a display 818, 918 to display the representation 1100 to a user of the generation system. The display may be a display 918 comprised by or arranged at the generation system 10 or a display 818 arranged comprised by or arranged at the chromatography apparatus. The representation 1100 is further described in relation to FIG. 11.

Depending on which aspects the user to be fixed or not, the operational space may be defined by calculating different outer operational bounds.

This has the advantage of improving perception and reducing time for the user to understand and react to the information, e.g. to arrive at a viable configuration of the generation system 10. The representation 1100 may be adapted to visually illustrate the operational space, thereby adapting the presentation to the human physiology. E.g. by presenting a group of adjacent cells in a grid, thereby allowing the visual system of the user to automatically group cells/elements into patterns representing the operational space, see e.g. the Gestalt theory.

In one embodiment, the operational bounds are indicative of pH of the generated buffer solution for each of a plurality of combinations of concentrations of the components of the buffer solution.

The selection of concentrations of the components is very important and is of great importance to the process.

In one embodiment, the operational bounds are indicative of flowrate ranges of pump/s having system characteristics falling within the determined operational space.

In one embodiment, the operational bounds are indicative of volume ranges of containers having system characteristics falling within the determined operational space.

In one embodiment, the operational bounds are indicative of volume ranges of the components or concentration ranges required to generate the buffer solution.

Any number of operational bounds may be used and be combined to form the operational space.

In some embodiments, the method further comprises controlling the generation system 10 using control parameters derived or allocated using the operational space. In this embodiment, the method further comprises allocating control parameters that controls the generation system 10 to operate within the determined operational space and controlling the generation system 10 using the allocated control parameters.

In other words, providing the allocated control parameters or plurality of settings to one or more control systems 30, 810, 910 of the one or more systems 10 running the automated processes. The allocated control parameters may comprise one or more stock concentrations and/or one or more pump settings for respective pumps used in the automated process. Further retrieving/receiving information of a selected automated process of the one or more automated processes and/or the allocated control parameters by the control systems 30, 810, 910. A control mode for the control system 30, 810, 910 of the selected automated process may be determined; the automated process being run by the control system 30, 810, 910 using the control mode. The control mode comprises one or more of flow feedback, pH feedback and conductivity feedback. The automated process may be run as a buffer kitchen or as a chromatography system. When run as a chromatography system, the control mode may comprise programming of a quaternary valve of the chromatography system.

In one example, allocating control parameters that controls the generation system 10 to operate within the determined operational space comprises selecting a container from the subset of containers, described above, which is selected from the list of available containers capable of accommodating the required volume and allocating the volume of the selected container as a control parameter. E.g. by halting the generation of buffer solution after the container has been emptied or when the container is empty or substantially empty.

The control parameters may be allocated within the operation space/operational bounds by receiving input data from a user indicative of parameter values falling within the operational space/operational bounds.

The control parameters may be allocated within the operational space/operational bounds by optimizing or evaluating an objective function to allocate parameters falling within the operational space/operational bounds. The objective function may e.g. have a low cost for containers or components available and a higher cost to containers or components that needs to be ordered or otherwise obtained. The volume of the containers or concentration of the components representing the lowest cost may be allocated.

In one example, allocating control parameters that controls the generation system 10 to operate within the determined operational space comprises controlling a pump P1-P3, to a particular flowrate dependent on the concentration of the component held in the corresponding container C1-C4. I.e. controlling the pump to a flowrate to a first flowrate when a first concentration of the component is selected, and controlling the pump to a flowrate double of the first flowrate when a concentration of the component half of the first concentration is selected.

Figure 11:
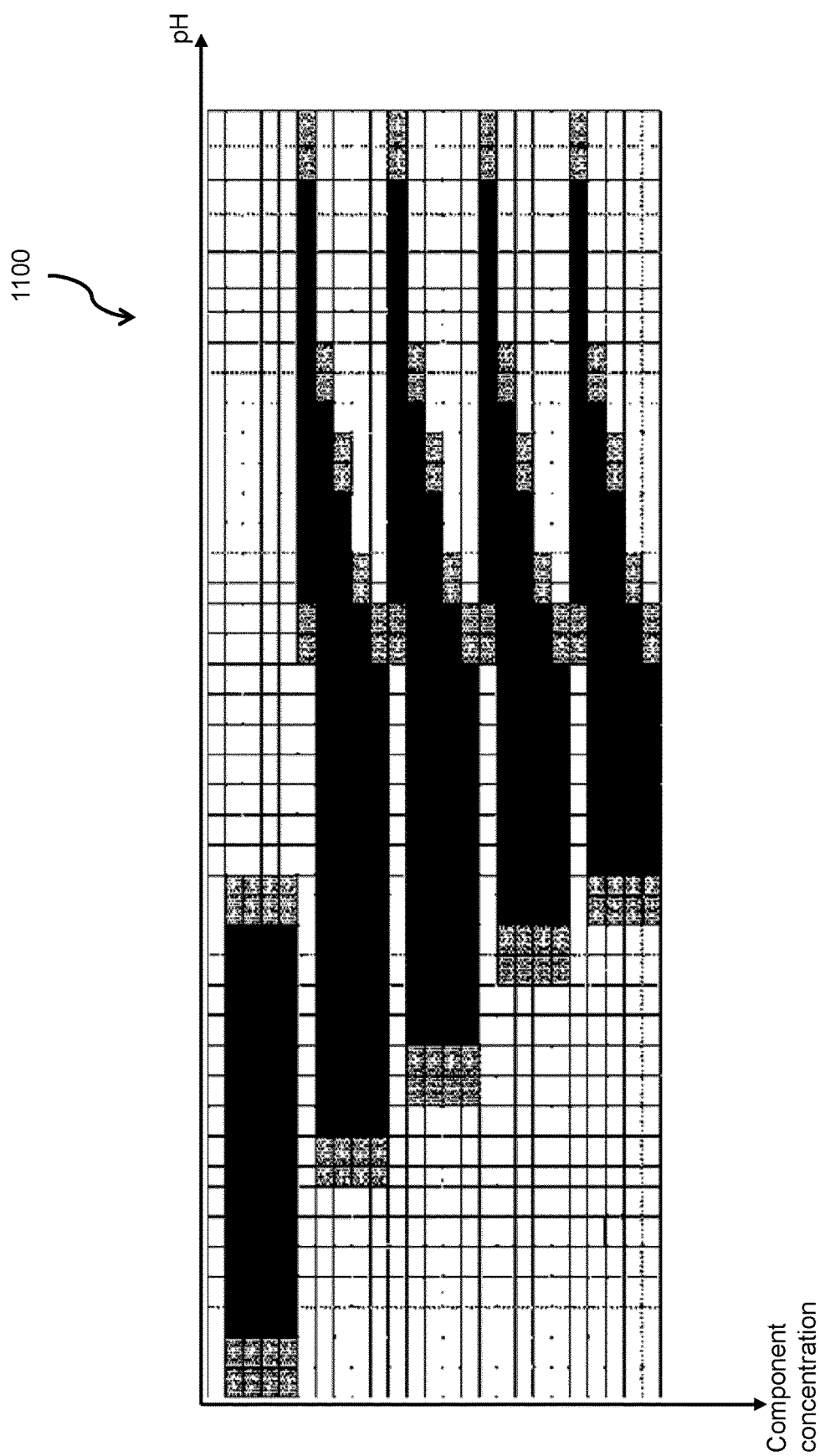
FIG. 11 shows a representation of an operational space according to one or more embodiments of the present disclosure.

FIG. 11 shows a representation 1100 of an operational space according to one or more embodiments of the present disclosure. An example of a representation is shown as a two-dimensional grid having two axes. The grid may represent pH values on one axis and combinations of concentrations of the components of the buffer solution on the other axis. The boxes of the grid are shown as empty if the corresponding combination of pH value and concentrations of the components does not represent a valid combination capable of generating the targeted buffer solution.

In one embodiment, a computer program is provided and comprises computer-executable instructions for causing the control unit 30, 810, 910 when the computer-executable instructions are executed on the processing circuitry comprised in the control unit 30, 810, 910 to perform any of the method steps described herein.

In one embodiment, a computer program product is provided and comprises a computer-readable storage medium, the computer-readable storage medium having the computer program above embodied therein.

A first exemplary embodiment of the disclosure is provided below. In this example a suitable hardware system and a suitable stock solution setup for one process is determined.

Figure 12:
FIG. 12 shows a table of exemplary target characteristics of a target buffer solution.

FIG. 12 shows a table 1200 of exemplary target characteristics of a target buffer solution. The table shows an index identifying the target buffer solution type in a first column. The table shows a target buffer solution name in a second column. The table shows a target pH of the buffer solution in a third column. The table shows a target salt concentration of the buffer solution in a fourth column. The table also shows a target flow rate of the buffer solution in a fifth column.

The information in the table forms the first input data of the target characteristics, i.e. buffer concentration, pH, salt concentration and highest and lowest flowrate, of the target buffers.

Based on the target flow rate of the buffer solution in the first input data, the customer needs a 1" system, or pipe dimensions of one (1) inch, thereby providing a flow rate range of 200-2000 Litres/hour for the target process 1, or the process for generating the target buffer solution in this example. In other words, the desired minimum flow rate falls within the flow rate range of a system using one-inch pipes.

FIG. 13 shows a table 1300 of exemplary system characteristics of the generation system. The second input data can then be seen as a choice among 8 system configurations, or 1×2×2×2, different combinations of the pumps presented in table 1300.

The third input data indicative of component characteristics used to generate the buffer solution, or in example 1 the concentration of the stock solutions of acid and base (components used to generate the buffer solution).

It is advantageous, typically to the users of the generation system, for the stock solutions to be as concentrated as possible, within solubility limits of the different components. This is because it gives a higher volume reduction. for the same reason, the pumps should be as small as possible. In this first example we have considered 5 different possible stock concentrations for the acid and the base, resulting in 25 different combinations.

In this example the molar recipe (molar concentrations or relative component proportions of acid and molar concentration of base in each one of the buffer solutions of the first input data) was calculated using the method described in U.S. Pat. No. 9,446,329B2 based on the solution of the Debye-Hückel equation wherein the ion size parameter a in the Debye-Hückel is calculated as the weighted mean ion size of all species contributing to the ionic strength of the generated buffer solution, the ionic strength of each species being used as a weighting parameter in the Debye-Hückel equation or application U.S. Ser. No. 12/988,553 incorporated herein by reference in its entirety.

The molar recipe for each component is then used in the following equations to obtain the pump flowrate of the acid and base pumps for all 25 combinations of stock solutions and 8 combination of pumps:

Acid flowrate=(molar concentration of acid/stock concentration of acid)×target buffer solution flowrate Base flowrate=(molar concentration of base/stock concentration of base)×target buffer solution flowrate The results of the final choice of combination of pumps, which gives the highest volume reduction, is presented in the table 1400.

FIG. 14 shows a table 1400 of exemplary system and/or component configurations. The first three columns comprise similar information to the columns shown in table 1200 in FIG. 12, i.e. target buffer type, target buffer flowrate and component concentrations. In the fourth column the outer operational bounds for the generation of the buffer solution is shown in the form of pump characteristics or sizes. Pump A denotes the size of the acid pump and pump B denotes the size of the base pump. In other words, the pumps P2 and P3 shown in FIG. 6.

The results for process 1 in this first example shows that this customer needs a 1" pipe system with a maximum capacity of 2000 L/h and size 3 on both pump A (P3) and pump B (P2) to be able to produce all desired buffers on one IC system. A system with other pump sizes would not give the same total volume reduction for the customer.

A second exemplary embodiment of the disclosure is provided below. In this second example a determination of suitable hardware system and stock solution setup for two processes are illustrated. In this example, the system will be used for running both the process 1 in example 1 and a second process, herein denoted process 2

The list of target buffer solutions for process 1 is the same as in example 1 and shown in FIG. 12.

The list of target buffer solutions for process 2 is shown in table 1500 in FIG. 15.

FIG. 15 shows a table 1500 of exemplary target characteristics of a target buffer solution. The table shows an index identifying the target buffer solution type in a first column. The table shows a target buffer solution name in a second column. The table shows a target pH of the buffer solution in a third column. The table shows a target salt concentration of the buffer solution in a fourth column. The table also shows a target flow rate of the buffer solution in a fifth column.

The procedure of the calculations for process 2 are similar as in process 1, presented in example 1 above.

FIG. 16 shows a table 1600 of exemplary system and/or component configurations. The results of this second example, show that this customer needs a 1" system with a maximum capacity of 2000 L/h and size 3 on both pump A (P3) and pump B (P2) to be able to produce all desired buffers on one generation system. The stock solutions with the highest possible concentrations are presented in the table 1600 in FIG. 16.

The same procedure can then be repeated for any further generation processes 3, 4 etc. The method can then show the hardware requirements for the individual processes as well as all processes combined.

Figure 17:
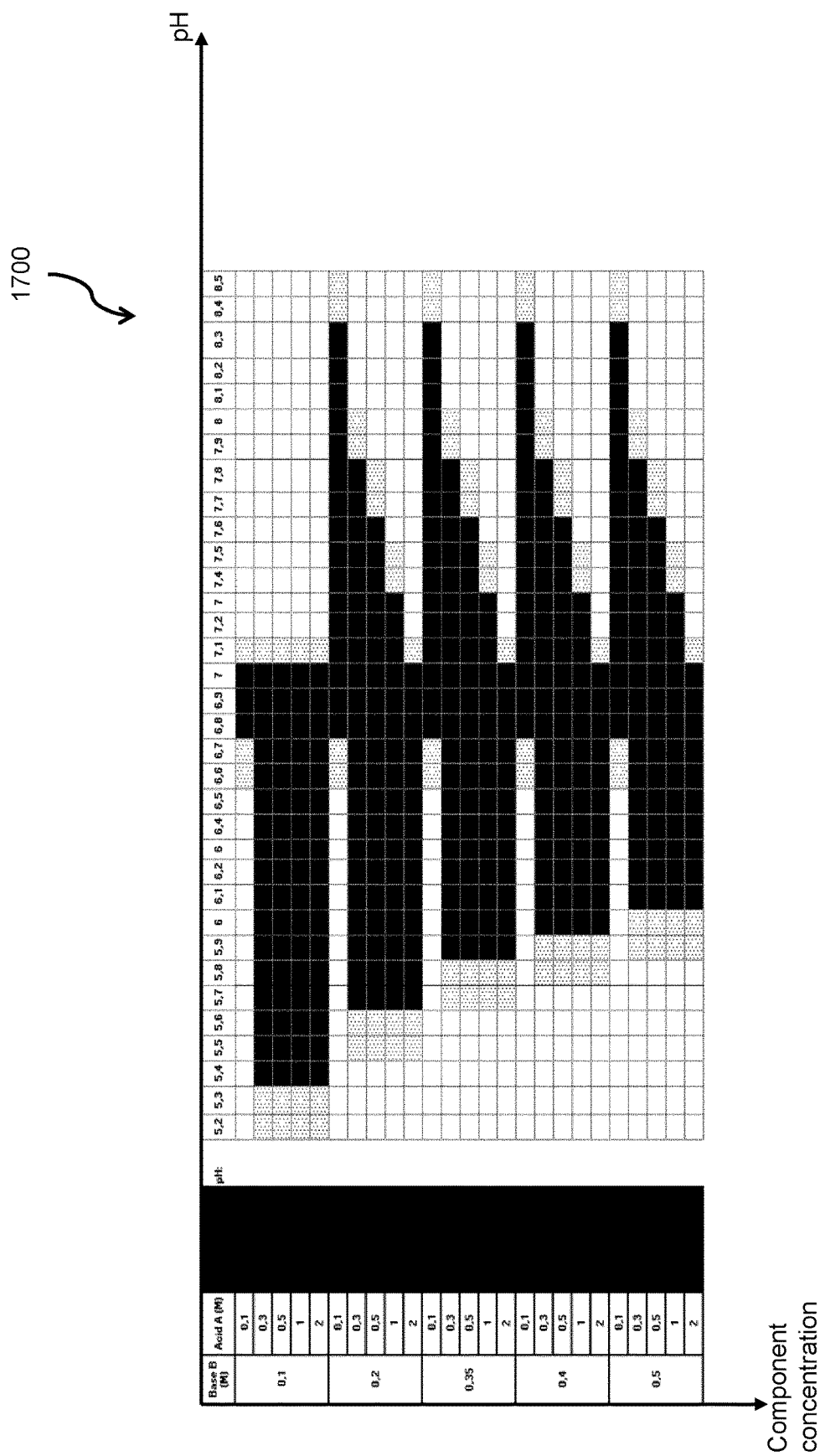
FIG. 17 shows a representation, of combined processes, of an operational space according to one or more embodiments of the present disclosure.

FIG. 17 shows a representation 1700, of combined processes, of an operational space according to one or more embodiments of the present disclosure. This overlay will show if the need is covered by one system size or if the customer needs systems of different sizes.

In other words, the operational space of two or more processes are overlaid, forming a combined operational space when operational spaces are laid on top of each other.

In embodiments, the communications network communicate using wired or wireless communication techniques that may include at least one of a Local Area Network (LAN), Metropolitan Area Network (MAN), Global System for Mobile Network (GSM), Enhanced Data GSM Environment (EDGE), Universal Mobile Telecommunications System, Long term evolution, High Speed Downlink Packet Access (HSDPA), Wideband Code Division Multiple Access (W-CDMA), Code Division Multiple Access (CDMA), Time Division Multiple Access (TDMA), Bluetooth®, Zigbee®, Wi-Fi, Voice over Internet Protocol (VoIP), LTE Advanced, IEEE802.16m, WirelessMAN-Advanced, Evolved High-Speed Packet Access (HSPA+), 3GPP Long Term Evolution (LTE), Mobile WiMAX (IEEE 802.16e), Ultra Mobile Broadband (UMB) (formerly Evolution-Data Optimized (EV-DO) Rev. C), Fast Low-latency Access with Seamless Handoff Orthogonal Frequency Division Multiplexing (Flash-OFDM), High Capacity Spatial Division Multiple Access (iBurst®) and Mobile Broadband Wireless Access (MBWA) (IEEE 802.20) systems, High Performance Radio Metropolitan Area Network (HIPERMAN), Beam-Division Multiple Access (BDMA), World Interoperability for Microwave Access (Wi-MAX) and ultrasonic communication, etc., but is not limited thereto.

Moreover, it is realized by the skilled person that the control unit 30, CU, 810, 910 may comprise the necessary communication capabilities in the form of e.g., functions, means, units, elements, etc., for performing the present solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the present solution.

Especially, the processing circuitry and/or processing means of the present disclosure may comprise one or more instances of processing circuitry, processor modules and multiple processors configured to cooperate with each-other, Central Processing Unit (CPU), a processing unit, a processing circuit, a processor, an Application Specific Integrated Circuit (ASIC), a microprocessor, a Field-Programmable Gate Array (FPGA) or other processing logic that may interpret and execute instructions. The expression "processing circuitry" and/or "processing means" may thus represent a processing circuitry comprising a plurality of processing circuits, such as, e.g., any, some or all of the ones mentioned above. The processing means may further perform data processing functions for inputting, outputting, and processing of data comprising data buffering and device control functions, such as user interface control, or the like.

The description of the example embodiments provided herein have been presented for purposes of illustration. The description is not intended to be exhaustive or to limit example embodiments to the precise form disclosed; modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of buffer tools, buffer management systems, corresponding methods, and computer program products. It should be appreciated that the example embodiments presented herein may be practiced in combination with each other.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

Hence, it should be understood that the details of the described embodiments are merely examples brought forward for illustrative purposes, and that all variations that fall within the scope of the claims are intended to be embraced therein.

The invention claimed is:

1. A computer-implemented method for controlling preparation of a liquid mixture comprising an acid and its conjugate base or a base and its conjugate acid, the method comprising:
   obtaining a composition for the liquid mixture to be prepared;
   determining a plurality of settings for controlling a preparation of the liquid mixture in one or more automated processes; and
   providing the plurality of settings to one or more control systems of the one or more automated processes;
   wherein determining a plurality of settings for controlling the preparation of the liquid mixture comprises retrieving information of a selected automated process of the one or more automated processes, determining a control mode for a control system of the selected automated process and wherein the automated process is run using the control mode.

2. The method of claim 1, wherein obtaining a composition for the liquid to be prepared comprises:
   prompting for information of a plurality of attributes of the liquid mixture, and
   in response to receiving information of the plurality of attributes, determining the composition for the liquid mixture to be prepared by applying at least one software-implemented algorithm.

3. The method of claim 2, wherein the attributes comprise a liquid mixture type, a liquid mixture concentration and at least one of a liquid mixture density and a liquid mixture conductivity and wherein the software-implemented algorithm is an algorithm for molarity calculation or molar mass calculation.

4. The method of claim 1, wherein obtaining a composition for the liquid to be prepared comprises:
   obtaining design of experiment, DoE, data, wherein the DoE data is indicative of a set of buffer compositions and corresponding unique recipes,
   running a first set of experiments,
   obtaining results of experiment, RoE, data as output from the first set of experiments, and,
   obtaining the composition by selecting one buffer composition from the set of buffer compositions which corresponding buffer characteristics optimize an objective function.

5. The method of claim 1, wherein the control mode comprises flow feedback.

6. The method of claim 1, wherein the control mode comprises pH feedback.

7. The method of claim 1, wherein the control mode further comprises conductivity feedback.

8. The method of claim 1, wherein the automated process is run as a buffer kitchen or as a chromatography system.

9. The method of claim 8, wherein the control mode comprises programming of a quaternary valve of a chromatography system.

10. The method of claim 1, wherein determining a plurality of settings for controlling the preparation of the liquid mixture further comprises:
determining one or more stock concentrations; and
determining one or more pump settings for respective pumps used in the automated process.

11. The method of claim 10, wherein determining a plurality of settings for controlling the preparation of the liquid mixture further comprises:
retrieving one or more boundary conditions for respective settings from the one or more control systems, and
validating fulfilment of the one or more boundary conditions.

12. The method of claim 11, further comprising:
retrieving one or more buffer recipes for preparing respective liquid mixtures from a database comprising buffer recipes,
selecting one or more stock solutions based on the boundary conditions, wherein boundary conditions comprise a volume needed from respective stock solutions for preparing liquid mixtures based on the retrieved buffer recipes,
for each selected stock solution, determining a minimum a number of stock concentrations for the retrieved one or more buffer recipes, and
update the one or more buffer recipes with the stock concentrations selected from the determined minimum number of stock concentrations.

13. The method of claim 11, wherein the one or more boundary conditions comprise one or more of an acid stock volume, a base stock volume, a minimum flow rate, and a maximum flow rate for the respective pumps used in the automated process.

14. The method of claim 11, wherein providing the plurality of settings to one or more control systems of the one or more automated processes comprises providing the plurality of settings to the control system when each boundary is fulfilled.

15. The method of claim 11, wherein providing the plurality of settings to one or more control systems of the one or more automated processes comprises:
determining a plurality of settings for controlling the preparation of a substitute liquid mixture when failing to fulfil at least one boundary condition, and
providing the plurality of settings of the substitute liquid mixture to the one or more control systems.

16. The method of claim 1, further comprising:
receiving feedback sensor data from the one or more automated processes, determining at least one adjusted setting for controlling the preparation of the liquid mixture in one or more automated processes; and
providing the adjusted setting to the one or more control systems of the one or more automated processes.

17. A computer readable storage medium, having stored thereon a computer program which, when executed in a buffer tool, causes execution of the method according to claim 1.

18. A computer program comprising computer-executable instructions for causing a control unit, when the computer-executable instructions are executed on processing circuitry comprised in the control unit, to perform the method steps of claim 1.

19. A computer program product comprising a computer-readable storage medium, the computer-readable storage medium having the computer program of claim 18 embodied therein.

20. A buffer tool for controlling preparation of a liquid mixture comprising an acid and its conjugate base or a base and its conjugate acid, the buffer tool comprising:
a liquid mixture composition interface,
a process control interface, and
processing circuitry configured to:
obtain a composition for the liquid mixture to be prepared;
determine a plurality of settings for controlling the preparation of the liquid mixture in one or more automated processes; and
provide the plurality of settings to one or more control systems of the one or more automated processes;
wherein the determination of the plurality of settings for controlling the preparation of the liquid mixture comprises steps to retrieve information of a selected automated process of the one or more automated processes, determine a control mode for a control system of the selected automated process and wherein the automated process is run using the control mode.

21. A buffer management system for controlling preparation of a liquid mixture comprising an acid and its conjugate base or a base and its conjugate acid, the buffer management system comprising:
one or more automated process arrangements for preparation of a liquid mixture;
one or more control systems for controlling the one or more automated processes; and
a buffer tool according to claim 20.

22. The buffer management system of claim 21, wherein the buffer management system is a chromatography system.

* * * * *